United States Patent
Choi et al.

(10) Patent No.: US 12,040,534 B2
(45) Date of Patent: Jul. 16, 2024

(54) ELECTRONIC DEVICE HAVING TRANSPARENT ANTENNA

(71) Applicant: LG ELECTRONICS INC., Seoul (KR)

(72) Inventors: Kukheon Choi, Seoul (KR); Ilnam Cho, Seoul (KR); Seungmin Woo, Seoul (KR); Byeongyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 17/755,854

(22) PCT Filed: Dec. 5, 2019

(86) PCT No.: PCT/KR2019/017064
§ 371 (c)(1),
(2) Date: May 10, 2022

(87) PCT Pub. No.: WO2021/112286
PCT Pub. Date: Jun. 10, 2021

(65) Prior Publication Data
US 2022/0384933 A1 Dec. 1, 2022

(51) Int. Cl.
*H01Q 1/36* (2006.01)
*H01Q 1/24* (2006.01)
(Continued)

(52) U.S. Cl.
CPC .............. *H01Q 1/243* (2013.01); *H01Q 1/36* (2013.01); *H01Q 1/44* (2013.01); *H01Q 5/42* (2015.01); *H01Q 9/045* (2013.01); *H04B 7/0413* (2013.01)

(58) Field of Classification Search
None
See application file for complete search history.

(56) References Cited

U.S. PATENT DOCUMENTS

2009/0051620 A1   2/2009  Ishibashi et al.
2012/0287018 A1* 11/2012  Parsche ................. H01L 31/042
                                                29/601
(Continued)

FOREIGN PATENT DOCUMENTS

CN      106484163 A    *  3/2017
JP      2015-191647       11/2015
(Continued)

OTHER PUBLICATIONS

PCT International Application No. PCT/KR2019/017064, International Search Report dated Oct. 20, 2020, 5 pages.

*Primary Examiner* — Ab Salam Alkassim, Jr.
*Assistant Examiner* — Anh N Ho
(74) *Attorney, Agent, or Firm* — LEE, HONG, DEGERMAN, KANG & WAIMEY

(57) ABSTRACT

Provided is an electronic device having a transparent antenna for 5G communication according to the present invention. The electronic device comprises: a transparent antenna embedded in a display to emit a signal to the front surface of the display; and a transmission line for feeding power to the transparent antenna. The transparent antenna includes: a first emitter configured as a first metal mesh grid on a first substrate; and a second emitter configured as a second metal mesh grid on a second substrate disposed above the first substrate.

15 Claims, 23 Drawing Sheets

(a) Upper + lower antenna (n=2)>

(b) Upper + lower antenna + mesh ground (n=2)>

(51) Int. Cl.
*H01Q 1/44* (2006.01)
*H01Q 5/42* (2015.01)
*H01Q 9/04* (2006.01)
*H04B 7/0413* (2017.01)

(56) References Cited

U.S. PATENT DOCUMENTS

2015/0101860 A1    4/2015  Lam
2015/0255856 A1*   9/2015  Hong .................... H01Q 21/061
                                                    343/702
2016/0328057 A1*  11/2016  Chai ..................... G06F 3/0412
2018/0046283 A1*   2/2018  Yoshida ................ G06F 3/0446
2020/0125202 A1*   4/2020  Li ......................... G06F 3/0446

FOREIGN PATENT DOCUMENTS

KR    2015-0104509    9/2015
KR    2019-0075136    6/2019

\* cited by examiner (a) lower antenna (n=2)>

(b) upper antenna (n=2)

(a) Upper + lower antenna (n=2)>

(b) Upper + lower antenna + mesh ground (n=2)>

(a) Mesh ground (b) Mesh ground + lower patch (a) Upper antenna (b) Ground + lower antenna + upper antenna (a) Top View (b) Side View

ELECTRONIC DEVICE HAVING TRANSPARENT ANTENNA

CROSS-REFERENCE TO RELATED APPLICATIONS

This application is the National Stage filing under 35 U.S.C. 371 of International Application No. PCT/KR2019/017064, filed on Dec. 5, 2019, the contents of which is hereby incorporated by reference herein in its entirety.

TECHNICAL FIELD

The present disclosure relates to an electronic device having a transparent antenna. One detailed implementation relates to an electronic device having a transparent antenna disposed in a display.

BACKGROUND ART

Electronic devices may be classified into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mmWave) band in addition to the Sub-6 band for a faster data rate.

Meanwhile, a 28 GHz band, a 39 GHz band, and a 64 GHz band are being considered as frequency bands to be allocated for 5G communication services in such mmWave bands. In this regard, a plurality of array antennas may be disposed in an electronic device in the mmWave bands.

In addition to the plurality of array antennas, a plurality of other antennas may be disposed in the electronic device.

Therefore, there is a need to transmit and receive signals through a front part of the electronic device while preventing interference with a plurality of existing antennas. To this end, research on a transparent antenna implemented as metal mesh lines embedded in a display of an electronic device is being conducted.

However, such an antenna having a metal mesh line structure may create a moiré effect due to spatial uniformity caused by the interval length between the metal mesh lines. Another problem is that antenna characteristics such as bandwidth characteristics may deteriorate because a transparent substrate where the transparent antenna is disposed is made very thin.

DISCLOSURE OF INVENTION

Technical Problem

The present disclosure is directed to solving the aforementioned problems and other drawbacks. Another aspect of the present disclosure is to reduce a moiré phenomenon in a display having a transparent antenna.

Yet another aspect of the present disclosure is to solve the reduction in visibility caused by the arrangement of metal mesh lines in an electronic device having a transparent antenna.

A further aspect of the present disclosure is to maintain antenna performance while solving the issue of visibility in a display having a transparent antenna.

Solution to Problem

To achieve these and other advantages and in accordance with the purpose of the present invention, as embodied and broadly described herein, there is provided an electronic device having an antenna including: a transparent antenna embedded in a display to radiate a signal to the front surface of the display; and a transmission line for feeding power to the transparent antenna, wherein the transparent antenna including: a first radiator configured as a first metal mesh grid on a first substrate; and a second radiator configured as a second metal mesh grid on a second substrate disposed above the first substrate.

According to an embodiment, the second metal mesh grid may be offset by a predetermined distance in one axial direction from the first metal mesh grid.

According to an embodiment, the electronic device may further include a third radiator configured as a third metal mesh grid on a third substrate disposed above the second substrate, wherein the third metal mesh grid may be offset by a predetermined distance in one axial direction from the second metal mesh grid, and the first to third metal mesh grids may be disposed in such a way that the interval length $IL_i$ between the metal mesh grids of adjacent substrate layers varies with each substrate layer.

According to an embodiment, the electronic device may further include a fourth radiator configured as a fourth metal mesh grid on a fourth substrate disposed above the third substrate, wherein the fourth metal mesh grid may be offset by a predetermined distance in one axial direction from the third metal mesh grid, and the first to fourth metal mesh grids may be disposed in such a way that the interval length $IL_i$ between the metal mesh grids of adjacent substrate layers varies with each substrate layer.

According to an embodiment, the interval length $IL_i$ between the metal mesh grids of adjacent substrate layers may be set to be greater than the minimum interval length $IL_{imin}$ between metal meshes for a target transparency of the transparent antenna. The minimum interval length $IL_{imin}$ between metal messes may decrease inversely as the target transparency and the number of substrate layers increase.

According to an embodiment, the interval length $IL_i$ between the metal mesh grids of adjacent substrate layers may be set to increase with increasing thickness, in consideration of different thicknesses of the substrate layers.

According to an embodiment, the first to third radiators may be first to third patch radiators, respectively, which include a plurality of metal mesh grid lines, wherein the first to third patch radiators may be formed as an inset structure for impedance matching, and the first to third patch radiators may differ in horizontal length, vertical length, inset length, and inset width so that the transparent antenna is capable of wideband operation.

According to an embodiment, the first to third metal mesh grids may be configured as diamond grids, where the diamond first to third metal mesh grids may be offset by a predetermined distance along the horizontal or vertical axis of the display.

According to an embodiment, the first to third radiators may be first to third patch radiators, respectively, which include a plurality of metal mesh grid lines, wherein the first to third metal mesh grids may be configured as diamond grids, and square metal mesh lines on the outer rims of the first to third radiators may be removed in order to reduce the moiré effect.

According to an embodiment, the transparent antenna may further include a ground layer including a plurality of metal mesh grids under the first radiator, so as to operate as a ground for the transparent antenna, wherein the plurality of metal mesh grids of the ground layer may be in alignment with the first metal mesh grid of the first radiator so as to maintain the transparency of the transparent antenna.

According to an embodiment, the first radiator may be connected to a first inset line for impedance matching, and the first inset line may be formed as a metal mesh line, wherein the transmission line may be formed as a coplanar waveguide (CPW) structure filled with metal in an untransparent region, and a first feed portion of the CPW structure may be disposed on the first substrate and connected to the first inset line of the first radiator.

According to an embodiment, the second radiator may be connected to a second inset line for impedance matching, and the second inset line may be formed as a metal mesh line, wherein a second feed portion of the CPW structure may be disposed on the second substrate and connected to the second inset line of the second radiator.

According to an embodiment, for the first to fourth metal mesh grids of the first to fourth radiators, the offset between the metal mesh grids of adjacent layers may be set to 100 um to 300 um.

According to an embodiment, the electronic device may further include: a transceiver circuit connected to the transmission line so as to apply a signal to the respective radiators of the transparent antenna; and a baseband processor connected to the transceiver circuit and configured to control the transceiver circuit.

According to an embodiment, the transparent antenna may include one-dimensional array antennas which are a plurality of transparent antenna elements placed a predetermined distance apart from each other, and the one-dimensional array antennas may be arranged as first to fourth array antennas in different areas of the display, wherein the baseband processor may perform MIMO by using two or more of the first to fourth array antennas.

According to an embodiment, the transparent antenna may include one-dimensional array antennas which are a plurality of transparent antenna elements placed a predetermined distance apart from each other, and the one-dimensional array antennas may be arranged as first to fourth array antennas in different areas of the display, wherein the baseband processor may perform MIMO by using two or more of the first to fourth array antennas and also may perform one-dimensional beamforming by controlling the transceiver circuit so as to vary the phase of a signal applied to the transparent antenna elements of the two or more array antennas.

Advantageous Effects of Invention

According to the present disclosure, it is possible to reduce a moiré phenomenon by means of metal mesh lines having an offset structure.

Furthermore, according to the present disclosure, it is possible to reduce a moiré phenomenon by means of metal mesh lines having an offset structure and at the same time improve antenna characteristics.

Furthermore, according to the present disclosure, it is possible to reduce a moiré phenomenon by means of metal mesh lines having an offset structure and at the same time enhance broadband characteristics and antenna efficiency.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

MODE FOR THE INVENTION

Figure 1A:
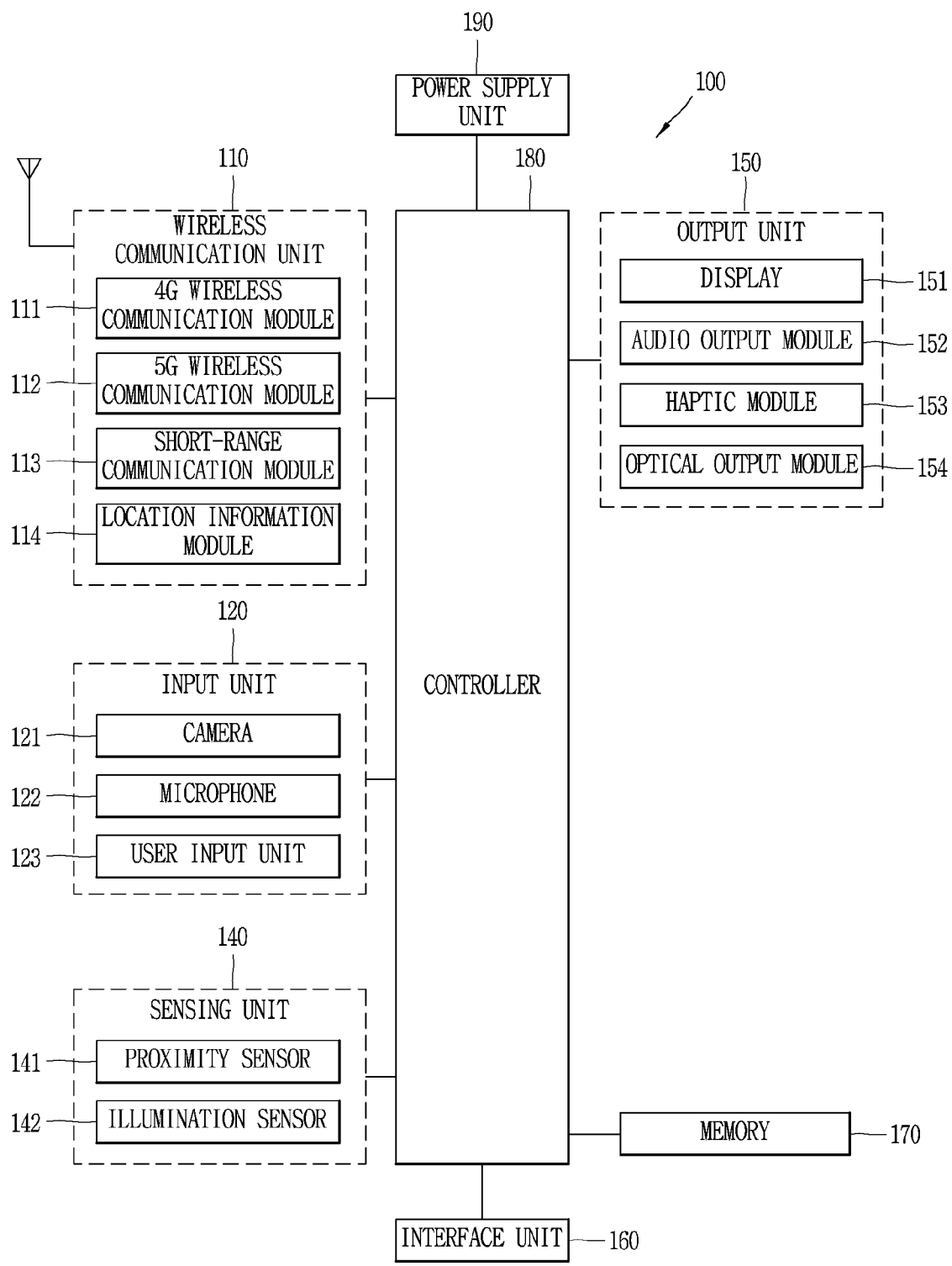
FIG. 1A is a block diagram of an electronic device in accordance with one implementation.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1B:
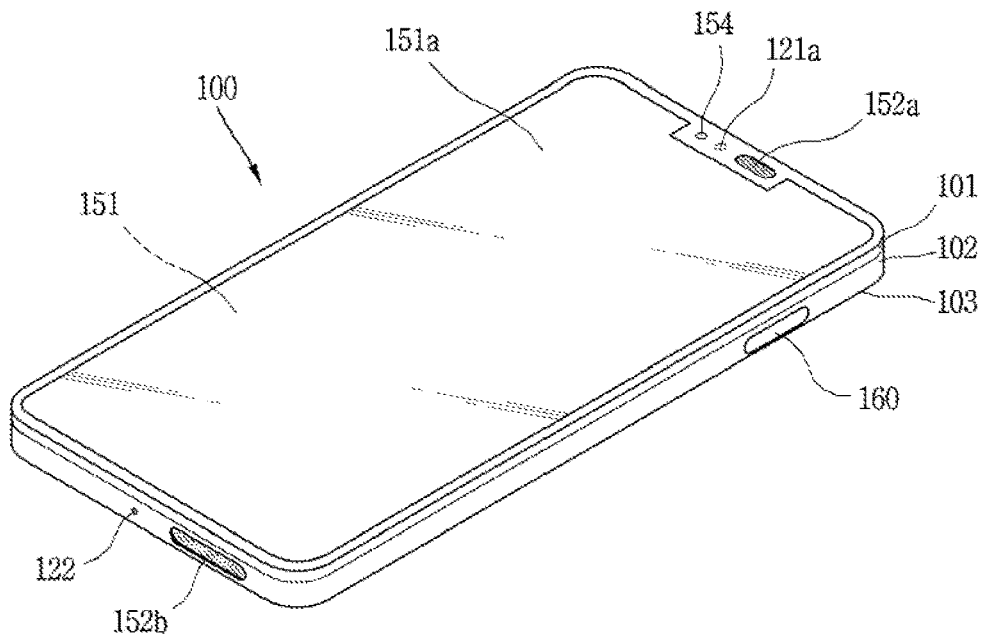
FIGS. 1B and 1C are conceptual views illustrating one example of the electronic device, viewed from different directions.
Figure 1C:
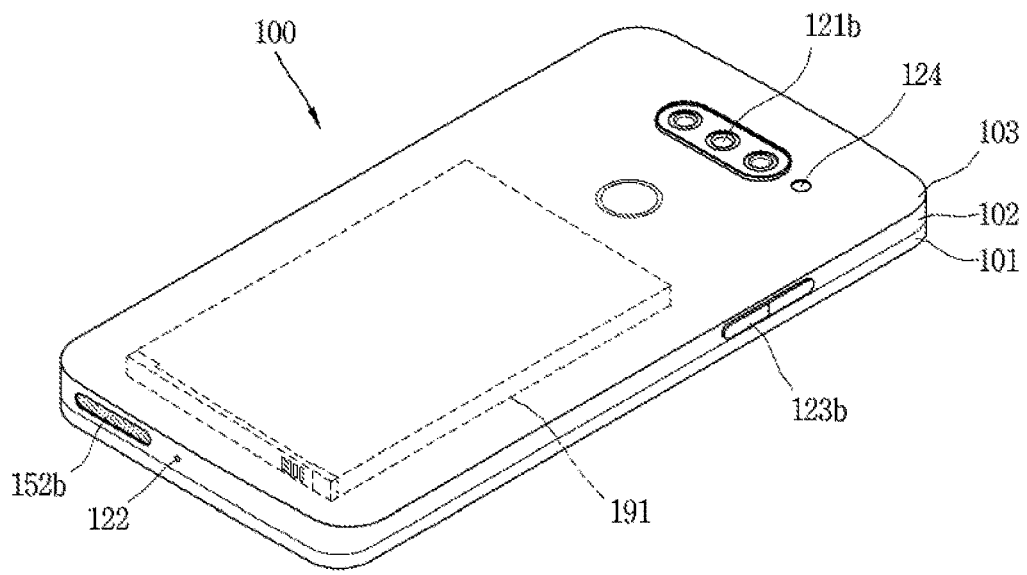

FIG. 1A is a block diagram of an electronic device in accordance with one implementation, and FIGS. 1B and 1C are conceptual views illustrating one example of the electronic device, viewed from different directions.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components illustrated in FIG. 1A is not a requirement, and that greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for example, a 4G communication network and a 5G communication network.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 113 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module. Or, 5G+WiFi CA may be performed using the 5G wireless communication module 112 and the Wi-Fi communication module.

The location information module 114 may be generally configured to detect, calculate, derive or otherwise identify a position (or current position) of the electronic device. As an example, the location information module 114 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensor unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The control unit 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least part of the components may cooperably operate to implement an operation, a control or a control method of an electronic device according to various implementations disclosed herein. Also, the operation, the control or the control method of the electronic device may be implemented on the electronic device by an activation of at least one application program stored in the memory 170.

Referring to FIGS. 1B and 1C, the disclosed electronic device 100 includes a bar-like terminal body. However, the present disclosure may not be necessarily limited to this, and may be also applicable to various structures such as a watch type, a clip type, a glasses type, a folder type in which two or more bodies are coupled to each other in a relatively movable manner, a flip type, a slide type, a swing type, a swivel type, and the like. Discussion herein will often relate to a particular type of electronic device. However, such teachings with regard to a particular type of electronic device will generally be applied to other types of electronic devices as well.

Here, considering the electronic device 100 as at least one assembly, the terminal body may be understood as a conception referring to the assembly.

The electronic device 100 will generally include a case (for example, frame, housing, cover, and the like) forming the appearance of the terminal. In this embodiment, the electronic device 100 may include a front case 101 and a rear case 102. Various electronic components may be incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted on the rear case 102 are exposed to the outside. Meanwhile, part of a side surface of the rear case 102 may be implemented to operate as a radiator.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The electronic device 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

The display 151 is generally configured to output information processed in the electronic device 100. For example, the display 151 may display execution screen information of an application program executing at the electronic device 100 or user interface (UI) and graphic user interface (GUI) information in response to the execution screen information.

The display 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a control unit 180 may generate a control command corresponding to the touch. Contents input in the touch manner may be characters, numbers, instructions in various modes, or a menu item that can be specified.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the control unit 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the electronic device 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

On the other hand, the electronic device 100 may include a finger scan sensor which scans a user's fingerprint. The controller 180 may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the electronic device 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the electronic device 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. Meanwhile, a plurality of antennas connected to the 4G wireless communication module 111 and the 5G wireless communication module 112 may be arranged on a side surface of the terminal. Alternatively, an antenna may be formed in a form of film to be attached onto an inner surface of the rear cover 103 or a case including a conductive material may serve as an antenna.

Meanwhile, the plurality of antennas arranged on a side surface of the terminal may be implemented with four or more antennas to support MIMO. In addition, when the 5G wireless communication module 112 operates in a millimeter-wave (mmWave) band, as each of the plurality of antennas is implemented as an array antenna, a plurality of array antennas may be arranged in the electronic device.

The terminal body is provided with a power supply unit 190 (see FIG. 1A) for supplying power to the electronic device 100. The power supply unit 190 may include a batter 191 which is mounted in the terminal body or detachably coupled to an outside of the terminal body.

Hereinafter, description will be given of embodiments of a multi-transmission system and an electronic device having the same, specifically, a power amplifier in a heterogeneous radio system and an electronic device having the same according to the present disclosure, with reference to the accompanying drawings. It will be apparent to those skilled in the art that the present disclosure may be embodied in other specific forms without departing from the idea or essential characteristics thereof.

Figure 2:
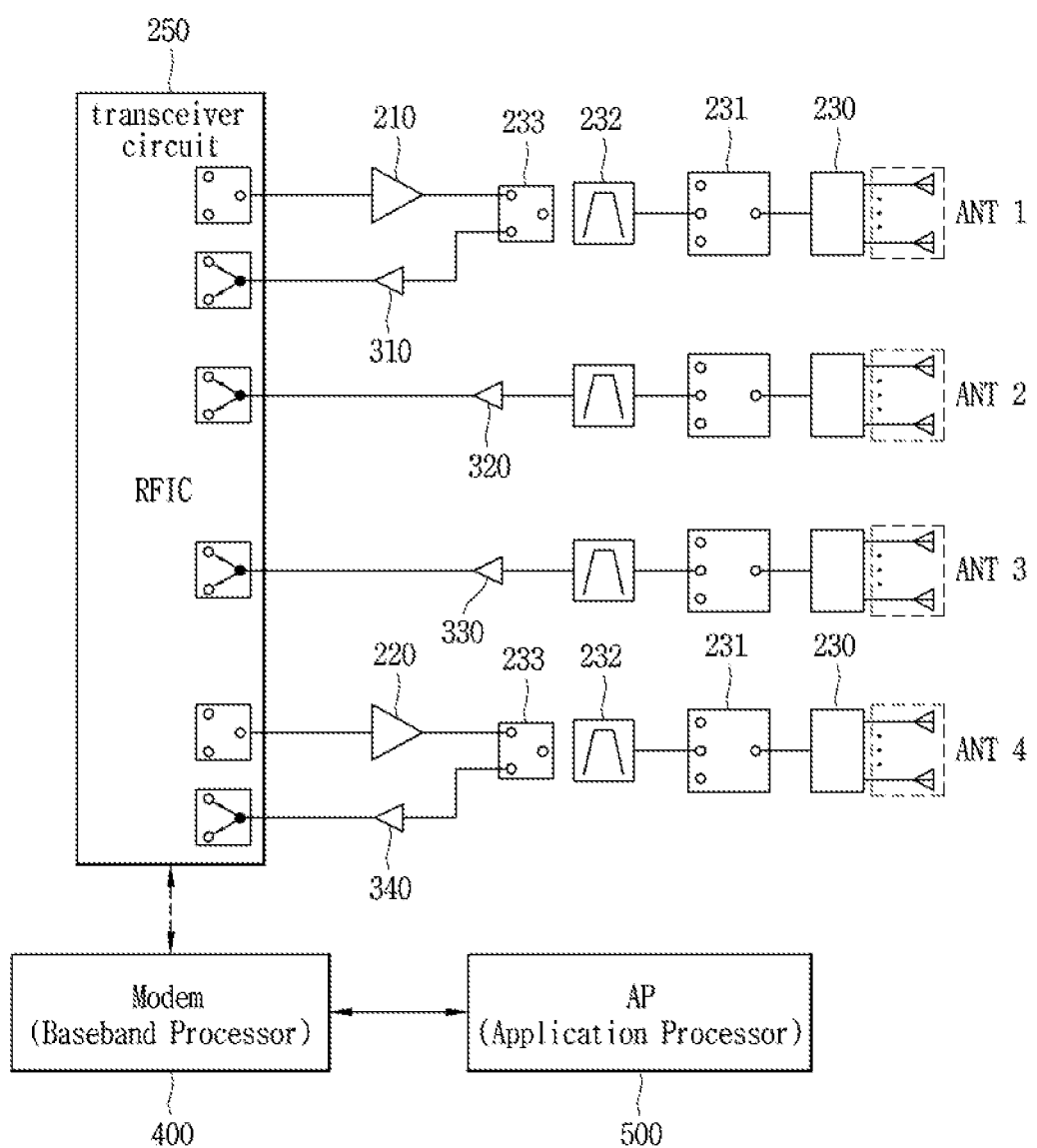
FIG. 2 is a block diagram illustrating an exemplary configuration of a wireless communication unit of an electronic device operable in a plurality of wireless communication systems.

FIG. 2 is a block diagram illustrating a configuration of a wireless communication unit of an electronic device operable in a plurality of wireless communication systems according to an embodiment. Referring to FIG. 2, the electronic device may include a first power amplifier 210, a second power amplifier 220, and an RFIC 250. In addition, the electronic device may further include a modem 400 and an application processor (AP) 500. Here, the modem 400 and the application processor (AP) 500 may be physically implemented on a single chip, and may be implemented in a logically and functionally separated form. However, the present disclosure may not be limited thereto and may be implemented in the form of a chip that is physically separated according to an application.

Meanwhile, the electronic device may include a plurality of low noise amplifiers (LNAs) 310 to 340 in the receiver. Here, the first power amplifier 210, the second power amplifier 220, the RFIC 250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2, the RFIC 250 may be configured as a 4G/5G integrated type, but the present disclosure may not be limited thereto. The RFIC 250 may be configured as a 4G/5G separate type according to an application. When the RFIC 250 is configured as the 4G/5G integrated type, it may be advantageous in terms of synchronization between 4G and 5G circuits, and simplification of control signaling by the modem 400.

On the other hand, when the RFIC 250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 250 may be configured as a 4G/5G separated type. As such, when the RFIC 250 is configured as the 4G/5G separate type, there may be an advantage that the RF characteristics can be optimized for each of the 4G band and the 5G band.

Meanwhile, even when the RFIC 250 is configured as a 4G/5G separation type, the 4G RFIC and the 5G RFIC may be logically and functionally separated but physically implemented on a single chip.

On the other hand, the application processor (AP) 500 may be configured to control the operation of each component of the electronic device. Specifically, the application processor (AP) 500 may control the operation of each component of the electronic device through the modem 400.

For example, the modem 400 may be controlled through a power management IC (PMIC) for low power operation of the electronic device. Accordingly, the modem 400 may operate power circuits of a transmitter and a receiver through the RFIC 250 in a low power mode.

In this regard, when it is determined that the electronic device is in an idle mode, the application processor (AP) 500 may control the RFIC 250 through the modem 300 as follows. For example, when the electronic device is in an idle mode, the application processor 280 may control the RFIC 250 through the modem 400, such that at least one of the first and second power amplifiers 210 and 220 operates in the low power mode or is turned off.

According to another implementation, the application processor (AP) 500 may control the modem 300 to enable wireless communication capable of performing low power communication when the electronic device is in a low battery mode. For example, when the electronic device is connected to a plurality of entities among a 4G base station, a 5G base station, and an access point, the application processor (AP) 500 may control the modem 400 to enable wireless communication at the lowest power. Accordingly, even though a throughput is slightly sacrificed, the application processor (AP) 500 may control the modem 400 and the RFIC 250 to perform short-range communication using only the short-range communication module 113.

According to another implementation, when a remaining battery capacity of the electronic device is equal to or greater than a threshold value, the application processor 1450 may control the modem 300 to select an optimal wireless interface. For example, the application processor (AP) 500 may control the modem 400 to receive data through both the 4G base station and the 5G base station according to the remaining battery capacity and the available radio resource information. In this case, the application processor (AP) 500 may receive the remaining battery capacity information from the PMIC and the available radio resource information from the modem 400. Accordingly, when the remaining battery capacity and the available radio resources are sufficient, the application processor (AP) 500 may control the modem 400 and the RFIC 250 to receive data through both the 4G base station and 5G base station.

Meanwhile, in a multi-transceiving system of FIG. 2, a transmitter and a receiver of each radio system may be integrated into a single transceiver. Accordingly, a circuit portion for integrating two types of system signals may be removed from an RF front-end.

Furthermore, since the front end parts can be controlled by an integrated transceiver, the front end parts may be more efficiently integrated than when the transceiving system is separated by communication systems.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 210 and the second power amplifier 220 may operate in at least one of the first and second communication systems. In this regard, when the 5G communication system operates in a 4G band or a Sub 6 band, the first and second power amplifiers 1210 and 220 can operate in both the first and second communication systems.

On the other hand, when the 5G communication system operates in a millimeter wave (mmWave) band, one of the first and second power amplifiers 210 and 220 may operate in the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is a millimeter wave (mmWave) band, the first to fourth antennas ANT1 to ANT4 may be configured to operate in one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 210 and 220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller.

In addition, the electronic device capable of operating in a plurality of wireless communication systems according to an implementation may further include a phase controller 230, a duplexer 231, a filter 232, and a switch 233.

In frequency bands such as mmWave bands, the electronic device needs to use directional beams to ensure coverage for communication with the base station. To this end, the antennas ANT1 to ANT4 may need to be implemented as array antennas ANT1 to ANT4 which include a plurality of antenna elements. The phase controller 230 may be configured to control the phase of signals applied to the respective antenna elements of the array antennas ANT1 to ANT4. In this regard, the phase controller 230 may control the amplitude and phase of signals applied to the respective antenna elements of the array antennas ANT1 to ANT4. Accordingly, the phase controller 230 may be called power and phase controllers 230 since it controls both the amplitude and phase of signals.

Thus, beamforming may be performed independently through the respective array antennas ANT1 to ANT4 by controlling the phase of signals applied to the respective antenna elements of the array antennas ANT1 to ANT4. In this regard, MIMO may be performed through the respective array antennas ANT1 to ANT4. In this case, the phase controller 230 may control the phase of signals applied to the respective antenna elements so that the respective array antennas ANT1 to ANT4 form a beam in different directions.

The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, signals in a reception band received through the antennas ANT1 and ANT4 are received by the low noise amplifiers 310 and 340 through a second output port of the duplexer 231.

The filter 232 may be configured to pass a signal in a transmission band or a reception band and to block a signal in a remaining band. In this case, the filter 232 may include a transmission filter connected to the first output port of the duplexer 231 and a reception filter connected to the second output port of the duplexer 231. Alternatively, the filter 232 may be configured to pass only the signal in the transmission band or only the signal in the reception band according to a control signal.

The switch 233 may be configured to transmit only one of a transmission signal and a reception signal. In an implementation of the present disclosure, the switch 233 may be configured in a single-pole double-throw (SPDT) form to separate the transmission signal and the reception signal in a time division duplex (TDD) scheme. In this case, the transmission signal and the reception signal may be in the same frequency band, and thus the duplexer 231 may be implemented in a form of a circulator.

Meanwhile, in another implementation of the present disclosure, the switch 233 may also be applied to a frequency division multiplex (FDD) scheme. In this case, the switch 233 may be configured in the form of a double-pole double-throw (DPDT) to connect or block a transmission signal and a reception signal, respectively. On the other hand, since the transmission signal and the reception signal can be separated by the duplexer 231, the switch 233 may not be necessarily required.

Meanwhile, the electronic device according to the present disclosure may further include a modem 400 corresponding to the controller. In this case, the RFIC 250 and the modem 400 may be referred to as a first controller (or a first processor) and a second controller (a second processor), respectively. On the other hand, the RFIC 250 and the modem 400 may be implemented as physically separated circuits. Alternatively, the RFIC 250 and the modem 400 may be logically or functionally distinguished from each other on one physical circuit.

The modem 400 may perform controlling of signal transmission and reception and processing of signals through different communication systems using the RFID 250. The modem 400 may acquire control information from a 4G base station and/or a 5G base station. Here, the control information may be received through a physical downlink control channel (PDCCH), but may not be limited thereto.

The modem 400 may control the RFIC 250 to transmit and/or receive signals through the first communication system and/or the second communication system for a specific time interval and from frequency resources. Accordingly, the RFIC 250 may control transmission circuits including the first and second power amplifiers 210 and 220 to transmit a 4G signal or a 5G signal in the specific time interval. In addition, the RFIC 250 may control reception circuits including the first to fourth low noise amplifiers 310 to 340 to receive a 4G signal or a 5G signal at a specific time interval.

Hereinafter, detailed operations and functions of an electronic device having a transparent antenna according to the present disclosure that includes the multi-transceiving system as illustrated in FIG. 2 will be discussed.

In a 5G communication system according to an example, a 5G frequency band may be a higher frequency band than a Sub6 band. For example, the 5G frequency band may be an mmWave band but is not limited thereto, and may be changed depending on applications.

Figure 3:
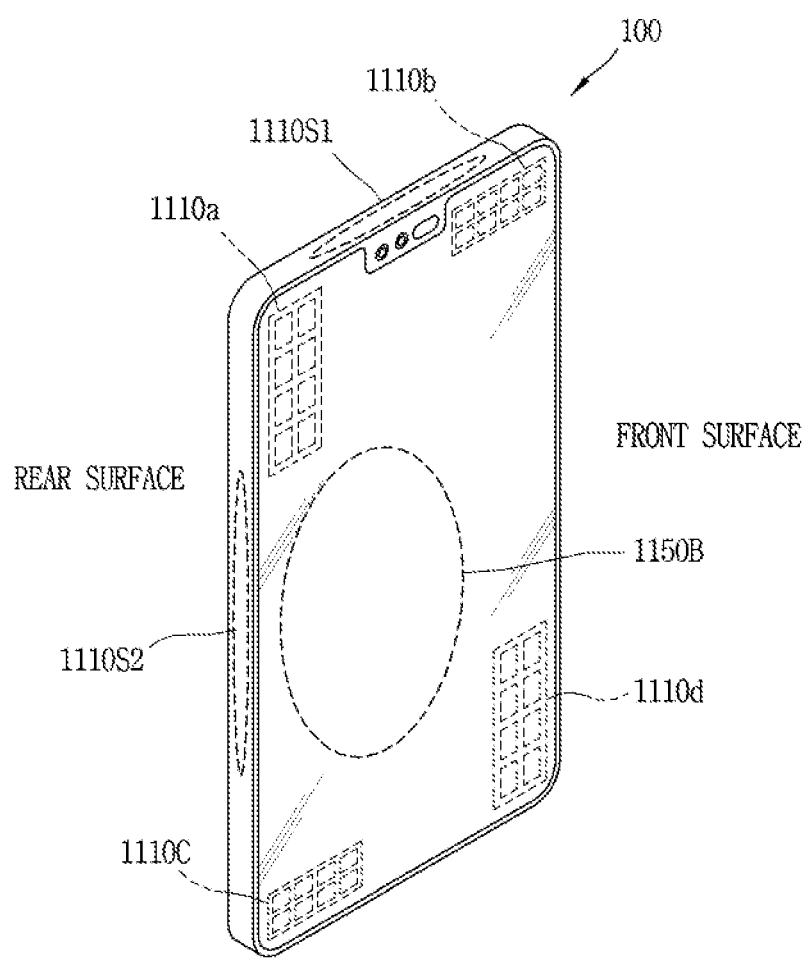
FIG. 3 illustrates an example of a configuration in which a plurality of antennas of the electronic device can be arranged.

FIG. 3 illustrates an example of a configuration in which a plurality of antennas of the electronic device can be arranged. Referring to FIG. 3, a plurality of antennas 1110a to 1110d may be arranged within the electronic device 100 or within the display. Here, the plurality of antennas 1110a to 1110d arranged within the display may be implemented as antennas arranged on a multi-layer substrate.

Moreover, the plurality of antennas 1110a to 1110d arranged within the display may be implemented as array antennas. In this regard, the plurality of array antennas 1110a to 1110d may be configured to transmit or receive signals in millimeter wave bands (mmWave bands).

Specifically, the plurality of antennas 1110a to 1110d arranged within the display may be implemented as one-dimensional array antennas or two-dimensional array antennas.

If the plurality of antennas 1110a to 1110d are arranged as one-dimensional array antennas, they may be called (M×1) array antennas, and beamforming may be performed in one axial direction in which the plurality of antennas is arranged.

In this regard, the one axial direction in which the plurality of antennas is arranged may be a horizontal direction.

In another embodiment, if the plurality of antennas 1110a to 1110d are arranged as one-dimensional array antennas, they may be called (1×N) array antennas, and beamforming may be performed in one axial direction in which the plurality of antennas is arranged. In this regard, the one axial direction in which the plurality of antennas is arranged may be a vertical direction.

In yet another embodiment, if the plurality of antennas 1110a to 1110d are arranged as two-dimensional array antennas, they may be called (M×N) array antennas. Meanwhile, beamforming may be performed in a first axial direction in which the plurality of antennas is arranged and/or in a second axial direction perpendicular to the first axial direction. The first axial direction in which the plurality of antennas is arranged may be a horizontal direction, and the second axial direction may be a vertical direction.

Referring to FIG. 3, the plurality of antennas 1110a to 1110d may be implemented as (M×N) array antennas, and therefore beamforming may be performed in both the horizontal direction and the vertical direction.

Meanwhile, the plurality of antennas 1110a to 1110d according to the present disclosure may be arranged in a state in which they are rotated a predetermined angle with respect to each other. Accordingly, the plurality of antennas 1110a to 1110d may be arranged easily with respect to each other, and the level of interference with each other may be reduced. Although FIG. 3 shows that the plurality of antennas 1110a to 1110d are arranged in a state in which they are substantially rotated 90 degrees with respect to each other, the present disclosure is not limited to this, and various changes may be made depending on the application. For example, the plurality of antennas 1110a to 1110d are arranged in a state in which they are substantially rotated 90 degrees with respect to each other.

Specifically, although the plurality of antennas 1110a to 1110d may be implemented as (4×2) array antennas, the number of antenna elements is not limited to this, and various changes may be made depending on the application.

Meanwhile, beamforming may be performed independently through the respective array antennas 1110a to 1110d. Meanwhile, multi-input multi-output (MIMO) or diversity may be performed through two array antennas among the plurality of array antennas 1110a to 1110d.

Moreover, a plurality of antennas 111051 and 1110S2 may be arranged on a side of the electronic device 100. Here, the number of antennas 111051 and 1110S2 arranged on the side is not limited to two, but may include four, six, eight, etc. depending on the application.

Meanwhile, some of the plurality of antennas 111051 and 1110S2 arranged on the side may be implemented as array antennas where a plurality of patch antennas are disposed, and may operate in millimeter wave bands. Alternatively, some of the plurality of antennas 111051 and 1110S2 arranged on the side may be implemented as conductive members and operate in a 4G band or 5G Sub6 band.

In addition, antennas 1150B may be arranged on the back side of the electronic device 100 or arranged inside the electronic device 100 to face the back side. Here, the number of antennas 1150B may include two, four, six, eight, etc. depending on the application, as is the above number of antennas 1110a to 1110d.

For example, in a case where the antennas 1150B arranged inside the electronic device 100 to face the back side are in a multi-layer substrate structure, the antenna elements may be arranged on the back side of a multi-layer substrate. Accordingly, the antennas 1150B may radiate signals toward the back side of the electronic device 100 by means of the antenna elements arrange don the back side of the multi-layer substrate. In this regard, a dielectric body may be arranged in a backside area of the electronic device 100 where signals are radiated by the antennas 1150B. Accordingly, a dielectric body may be formed in some part of the exterior of the electronic device 10 which is made of a metal casing.

In this regard, the antennas 1150B arranged inside the electronic device 10 to face the back side may be configured as a plurality of array antennas. Thus, the antennas 1150B arranged inside the electronic device 100 to face the back side may radiate signals toward the back side of the electronic device 100.

Specifically, the plurality of array antennas 1150B may be configured as mmWave antenna modules. Here, the mmWave antenna modules may be arranged on the back side, i.e., rear surface, of the electronic device 100, except for the area where a battery, a camera module, and a speaker module area disposed.

In some examples, referring to FIG. 2, a plurality of antennas ANT1 to ANT4 may be disposed on the front surface of the electronic device 100. Here, each of the plurality of antennas ANT1 to ANT4 may be configured as an array antenna to perform beamforming in mmWave bands. The plurality of antennas ANT1 to ANT4 configured as single antennas and/or phased array antennas for use of a radio circuit such as the transceiver circuit 250 may be mounted on the electronic device 100.

In some examples, referring to FIGS. 2 and 3, at least one signal may be transmitted or received through the plurality of antennas 1110a to 1110d corresponding to the plurality of antennas ANT1 to ANT4. In this regard, each of the plurality of antennas 1110a to 1110d may be configured as an array antenna. The electronic device may perform communication with a base station through any one of the plurality of antennas 1110a to 1110a to 1110d. Alternatively, the electronic device may perform Multi-input/Multi-output (MIMO) communication with the base station through two or more antennas among the plurality of antennas 1110a to 1110d.

In some examples, at least one signal may be transmitted or received through the plurality of antennas 111051 and 1110S2 on the side surfaces of the electronic device 100. On the other hand, at least one signal may be transmitted or received through the plurality of antennas 1110a and 1110d on the front surface of the electronic device 100. In this regard, each of the plurality of antennas 1110a to 1110d may be configured as an array antenna. The electronic device may perform communication with a base station through any one of the plurality of antennas 1110a to 1110a to 1110d. Alternatively, the electronic device may perform Multi-input/Multi-output (MIMO) communication with the base station through two or more antennas among the plurality of antennas 1110a to 1110d.

In some examples, at least one signal may be transmitted or received through the plurality of antennas 1110a to 1110d, 1150B, and 1110S1 to 1110S2 on the front surface and/or the side surfaces of the electronic device 100. In this regard, each of the plurality of antennas 1110a to 1110d, 1150B, and 1110S1 to 1110S2 may be configured as an array antenna. The electronic device may perform communication with a base station through any one of the plurality of antennas 1110a to 1110d, 1150B, and 111051 to 1110S2. Alternatively, the electronic device may perform MIMO communication with a base station through two or more antennas among the plurality of antennas 1110a to 1110d, 1150B, and 111051 to 1110S2.

Hereinafter, an electronic device having a transparent antenna that can operate in a mmWave band will be described. Specifically, an electronic device including a plurality of array antennas in the form of transparent antennas embedded in a display will be described.

Figure 4A:
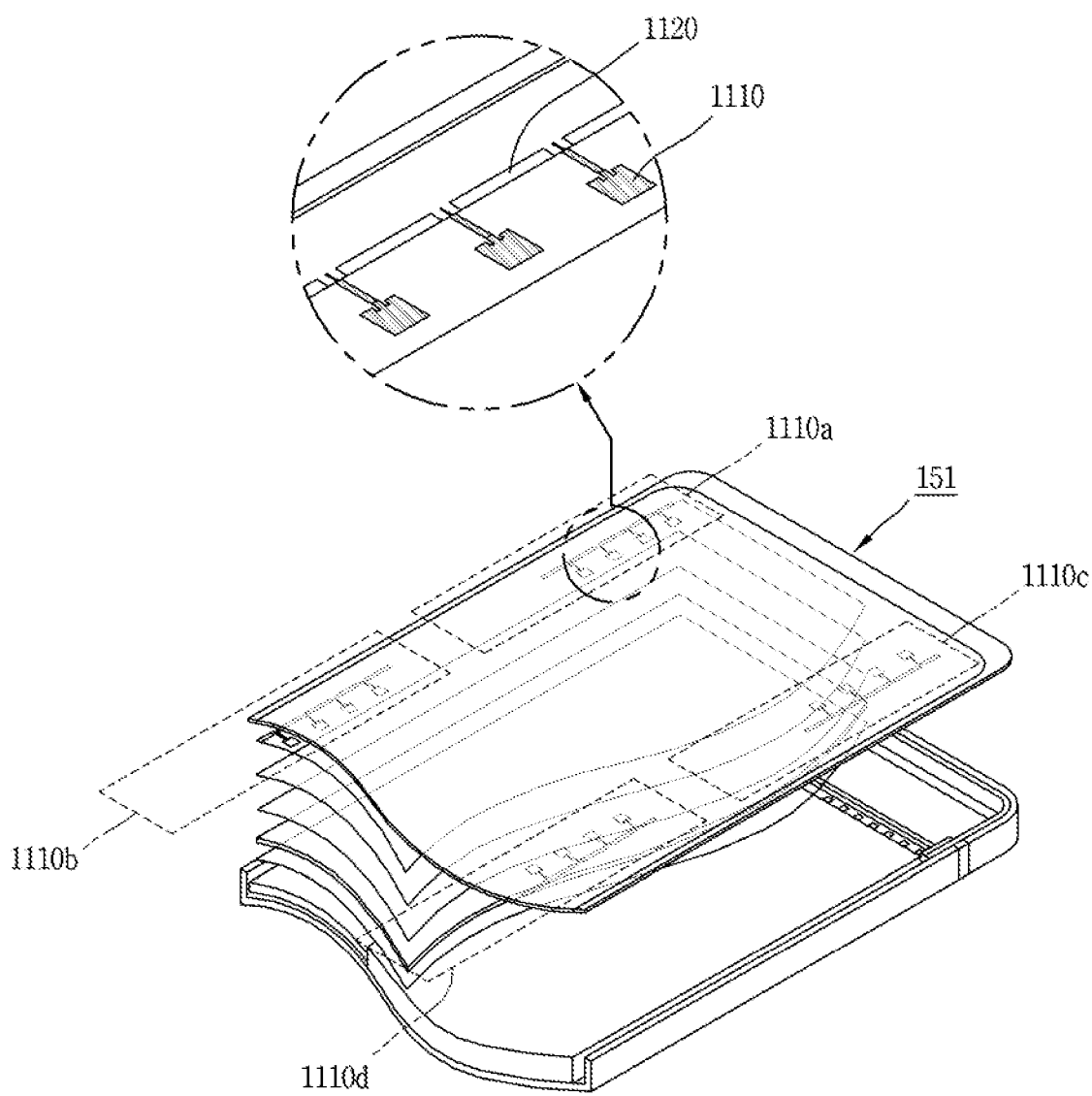
FIG. 4A illustrates an example of an electronic device having a transparent antenna and transmission lines embedded in a display.
Figure 4B:
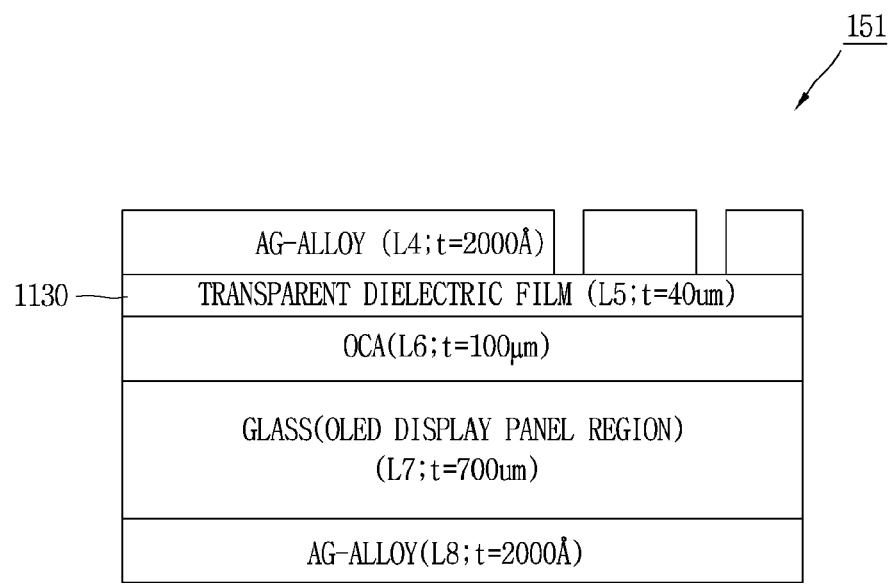
FIG. 4B illustrates a structure of a display in which the transparent antenna is embedded.

FIG. 4A illustrates an electronic device having a transparent antenna and a transmission line disposed in a display in accordance with an example. FIG. 4B illustrates a structure of a display in which the transparent antenna is disposed.

Referring to FIG. 4A, the electronic device may include an antenna 1110 embedded in a display 151 and a transmission line 1120 configured to feed power to the antenna 1110. Here, the display 151 may be configured as an OLED or LCD. In some examples, referring to FIGS. 3 and 4A, the electronic device may include a plurality of antennas ANT1 to ANT4 disposed in the display 151, and a transmission line 1120 to feed the antennas ANT1 to ANT4. Here, each of the plurality of antennas ANT1 to ANT4 may be implemented as an array antenna to perform beamforming. In some examples, array antennas of each of the plurality of antennas 1110a to 1110d may be spaced apart from one another to perform MIMO. In this regard, spatial beamforming may be performed so that respective beam directions by the plurality of antennas ANT1 to ANT4 are substantially orthogonal to one another.

In this regard, the antenna elements of each of the plurality of array antennas ANT1 to ANT4 may be formed as metal meshes disposed in one direction to improve visibility. In this regard, a metal mesh line formed in an oblique direction of a specific angle may be disposed inside each antenna element of each of the plurality of array antennas ANT1 to ANT4. However, the present disclosure may not be limited thereto, and a metal mesh line formed in a horizontal direction or a vertical direction may be disposed inside each antenna element.

In this regard, four antenna elements may implement one array antenna as illustrated in FIG. 4A. However, the present disclosure may not be limited thereto, and the array antenna may be implemented as a 2×1, 4×1, or 8×1 array antenna. Also, beamforming may be performed not only in one axial direction, for example, a horizontal direction, but also in another axial direction, for example, a vertical direction. To this end, the array antenna may change to a 2×2, 4×2, 4×4, or 2×4 array antenna. Beamforming can be performed in the mmWave bands using such array antennas.

In some examples, in the electronic device having the transparent antenna, the transparent antenna may operate in the Sub6 band. The transparent antenna operating in the Sub6 band may not be provided in the form of the array antenna. Therefore, the transparent antenna operating in the Sub6 band may be configured such that single antennas are spaced apart from one another to perform MIMO.

Accordingly, instead of the structure in which the patch antennas of FIG. 4A are disposed in the form of an array antenna, patch antennas as single antennas may be disposed at upper left, lower left, upper right, and lower right sides of the electronic device, and each patch antenna may perform MIMO.

Hereinafter, a display structure having transparent antennas therein will be described. Referring to FIG. 4B, a dielectric 1130, that is, a dielectric substrate, may be disposed on an OLED display panel and an OCA inside the display 151. Here, the dielectric 1130 in the form of a film may be used as the dielectric substrate of the antenna 1110. In addition, an antenna layer may be disposed on the dielectric 1130 in the form of the film. Here, the antenna layer may be made of alloy (Ag alloy), copper, aluminum, or the like. In some examples, the antenna 1110 and the transmission line 1120 of FIG. 4A may be disposed on the antenna layer.

Referring to FIGS. 4A and 4B, the transparent antenna may be configured such that the inside of a patch antenna has a metal mesh grid structure.

Figure 5A:
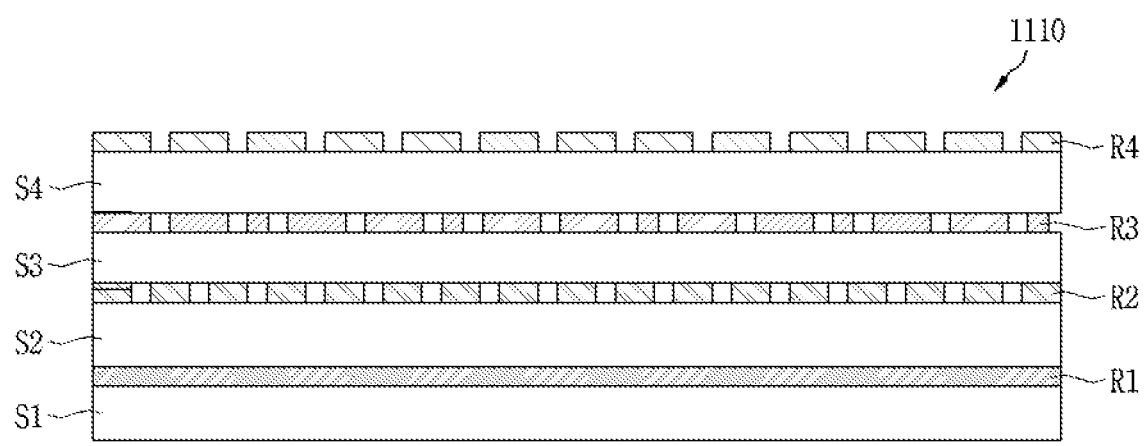
FIG. 5A shows a configuration in which a plurality of metal meshes are stacked on a multi-layer substrate according to an example.
Figure 5B:
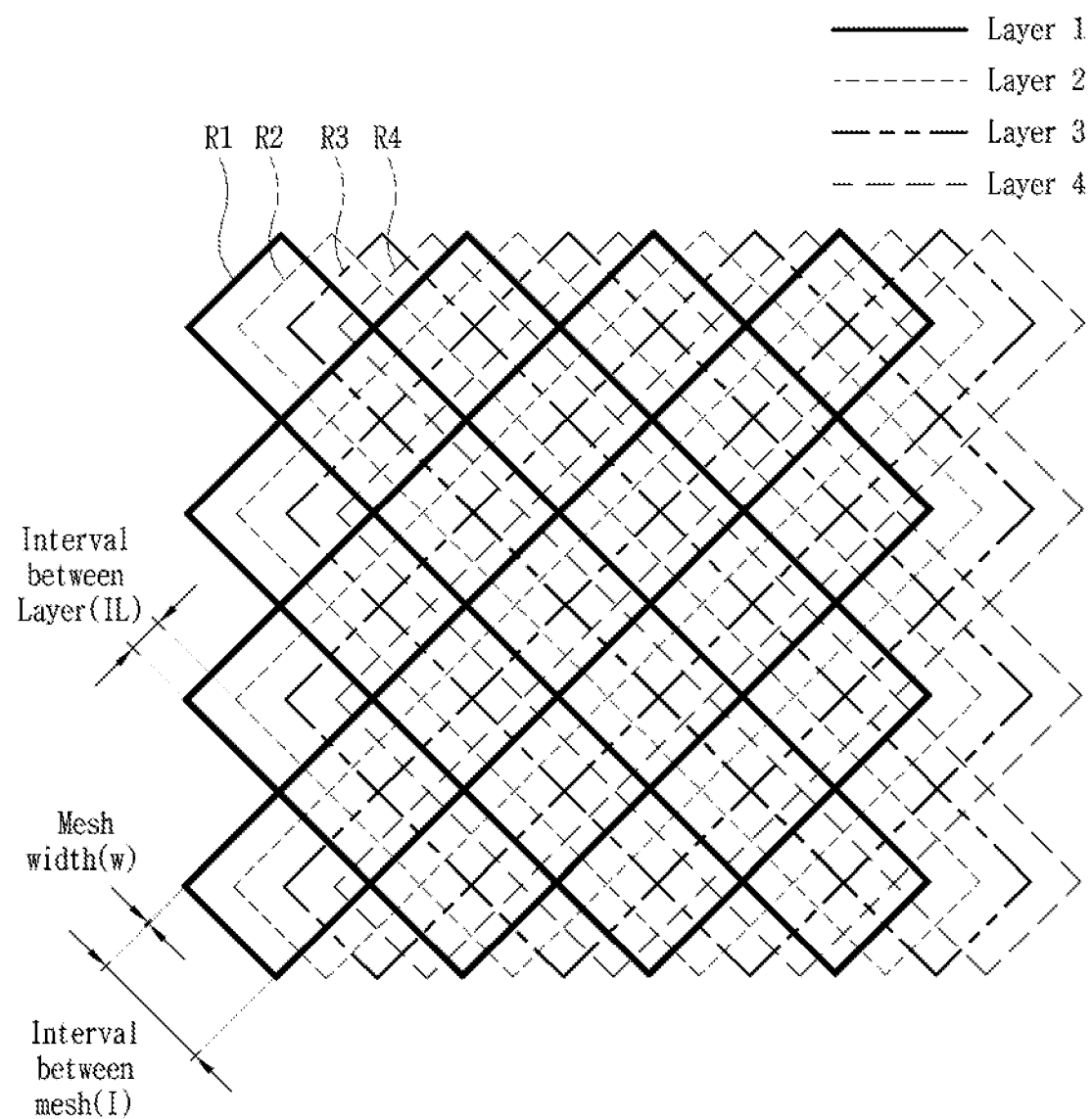
FIG. 5B shows a plurality of metal mesh grid structures placed apart from each other according to an embodiment.
Figure 5C:
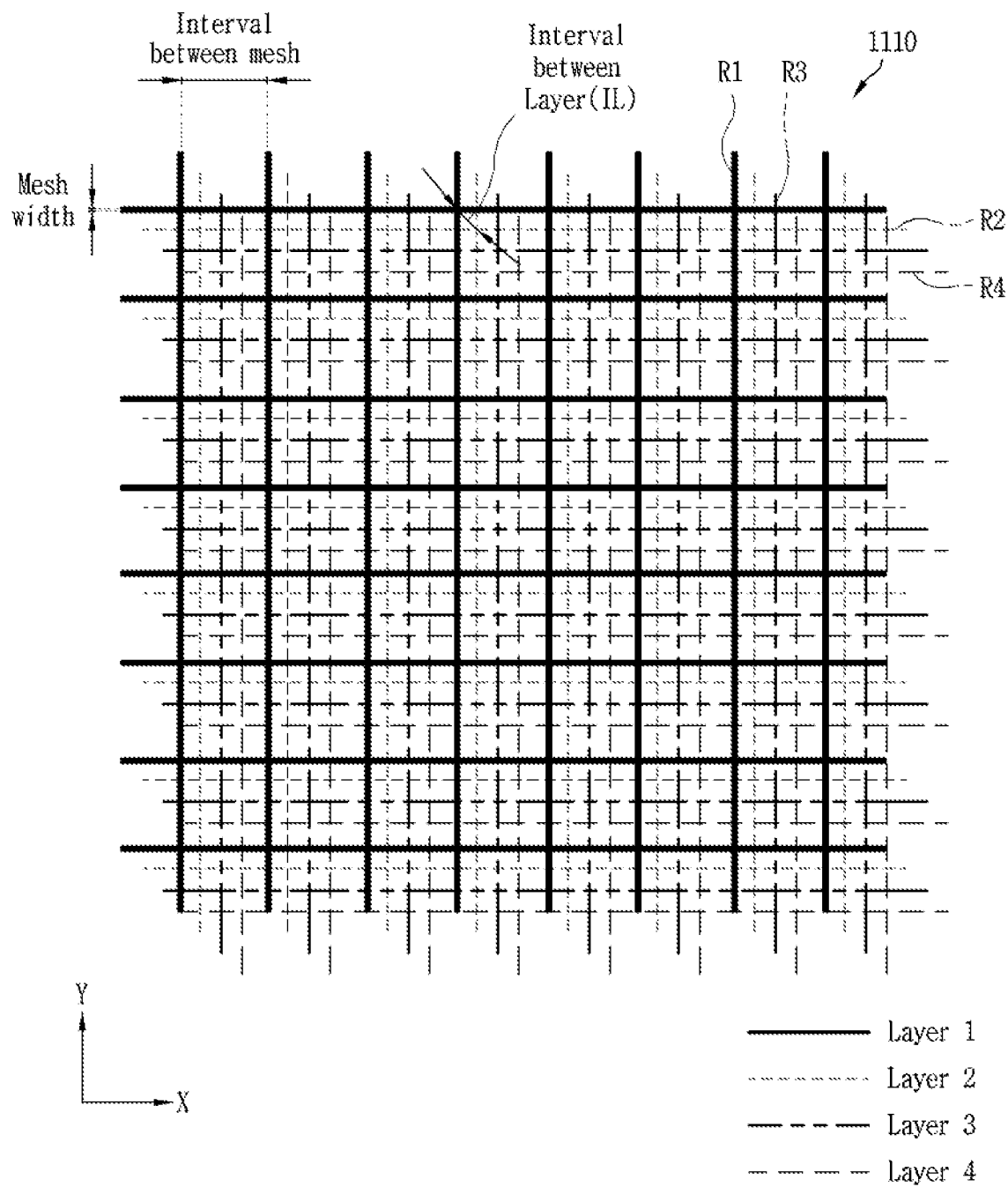
FIG. 5C shows a plurality of metal mesh grid structures placed apart from each other according to another embodiment.

In this regard, FIG. 5A shows a configuration in which a plurality of metal meshes are stacked on a multi-layer substrate according to an example. Meanwhile, FIG. 5B shows a plurality of metal mesh grid structures placed apart from each other according to an embodiment. Also, FIG. 5C shows a plurality of metal mesh grid structures placed apart from each other according to another embodiment. In this regard, FIG. 5B depicts diamond metal mesh grid structures shifted from each other. On the other hand, FIG. 5C depicts rectangular metal mesh grid structures shifted from each other.

Figure 6A:
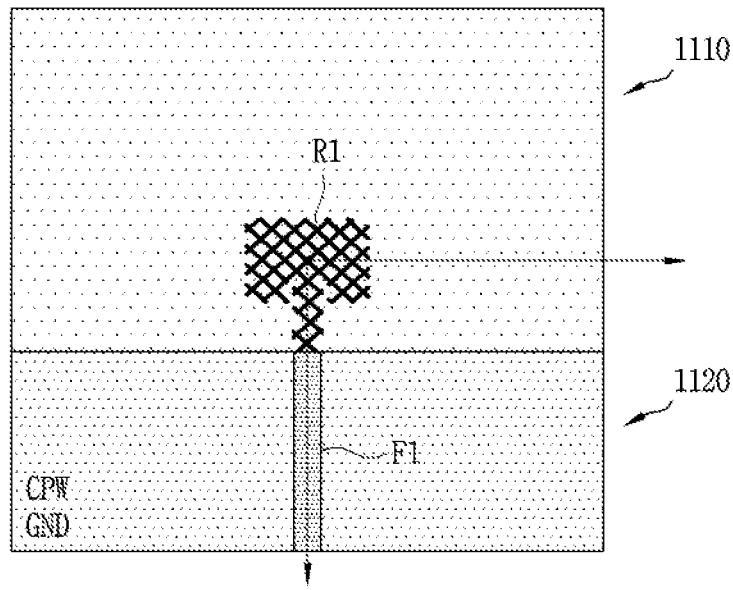
FIG. 6A shows structures of transparent antennas formed on different substrates according to an embodiment.
Figure 6A:
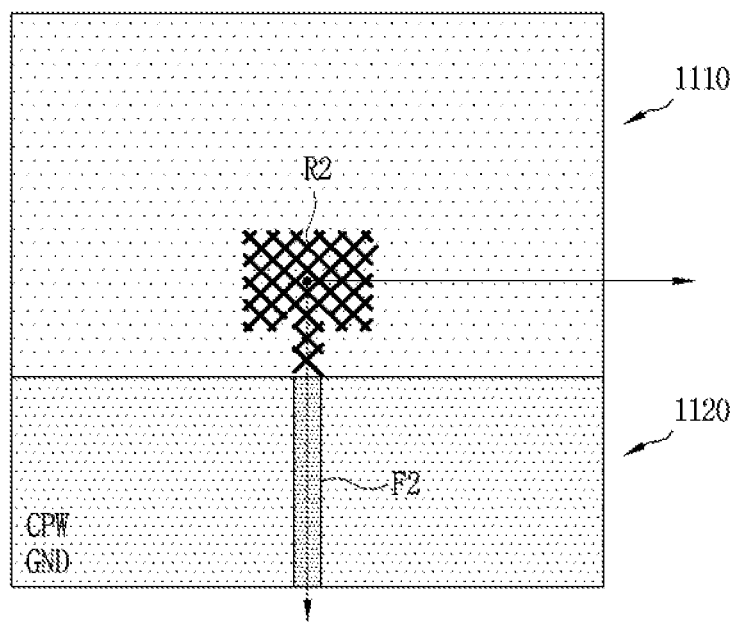
Figure 6B:
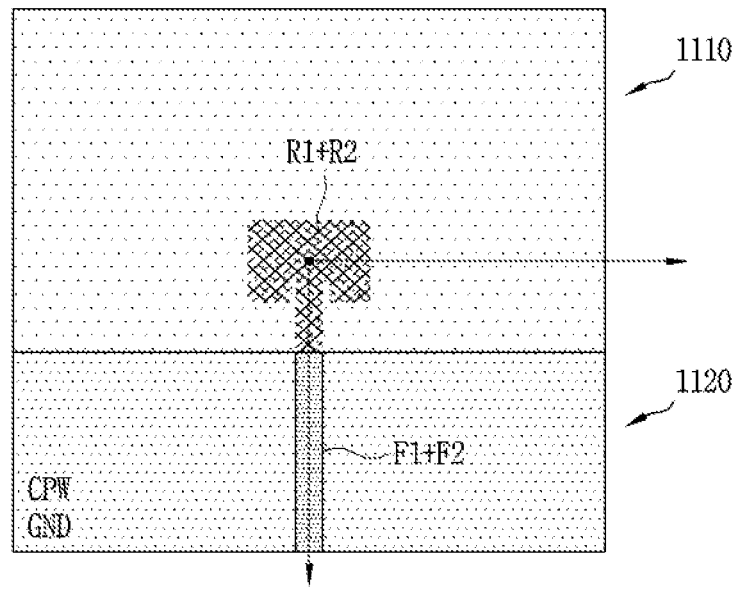
FIG. 6B shows aligned structures of the respective substrates on which the transparent antennas of FIG. 6A are formed.
Figure 6B:
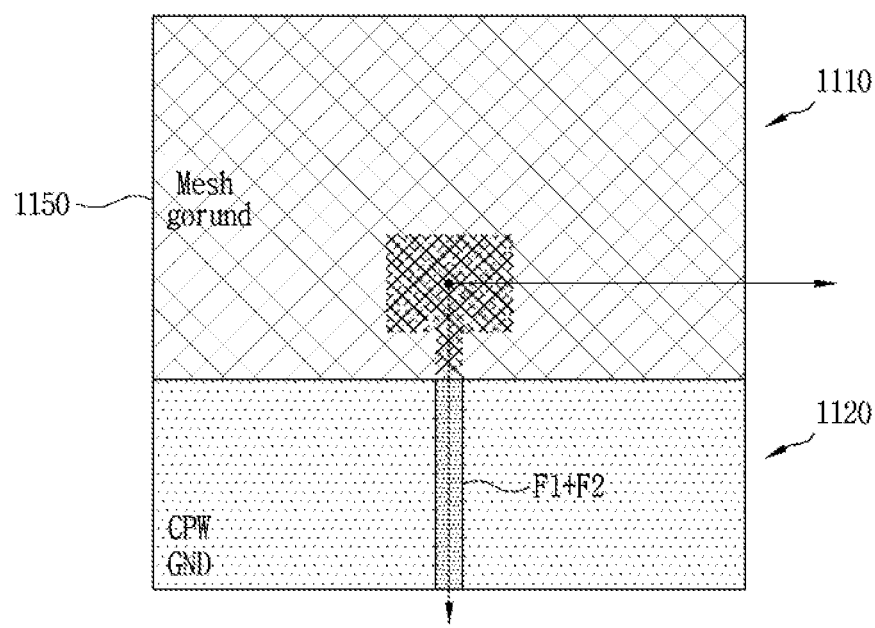

Meanwhile, FIG. 6A shows structures of transparent antennas formed on different substrates according to an embodiment. In this regard, FIG. 6B shows aligned structures of the respective substrates on which the transparent antennas of FIG. 6A are formed. In this regard, FIGS. 6A and 6B show antennas and part of feed portions whose rims are removed, in order to reduce the moiré effect.

Figure 7A:
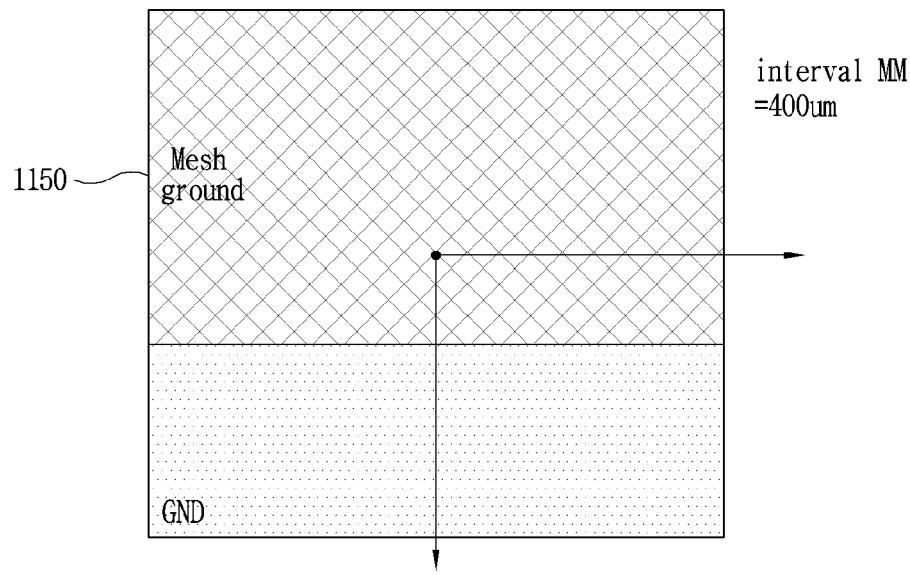
FIGS. 7A and 7B show structures of substrates on which both an antenna layer and a ground layer are implemented as a metal mesh grid structure.
Figure 7A:
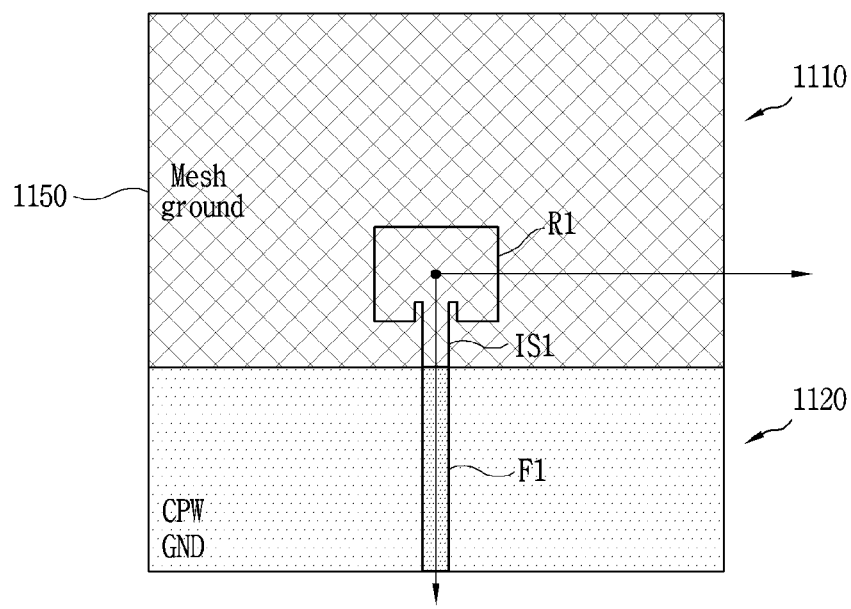
Figure 7B:
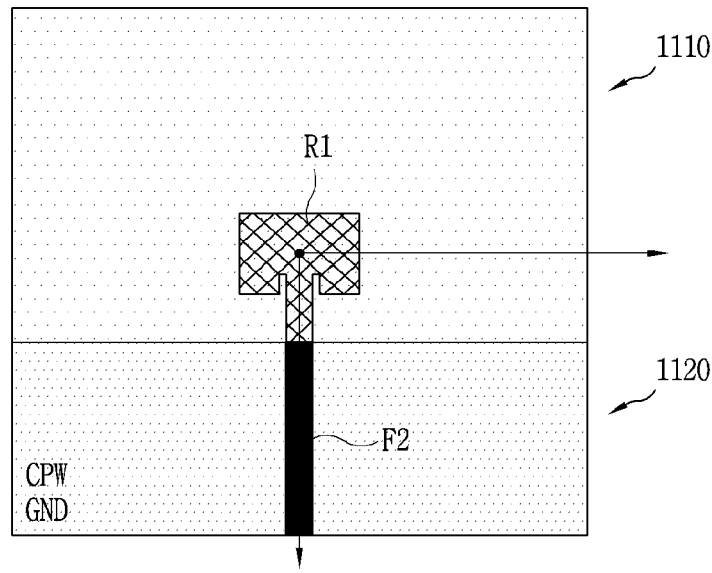
Figure 7B:
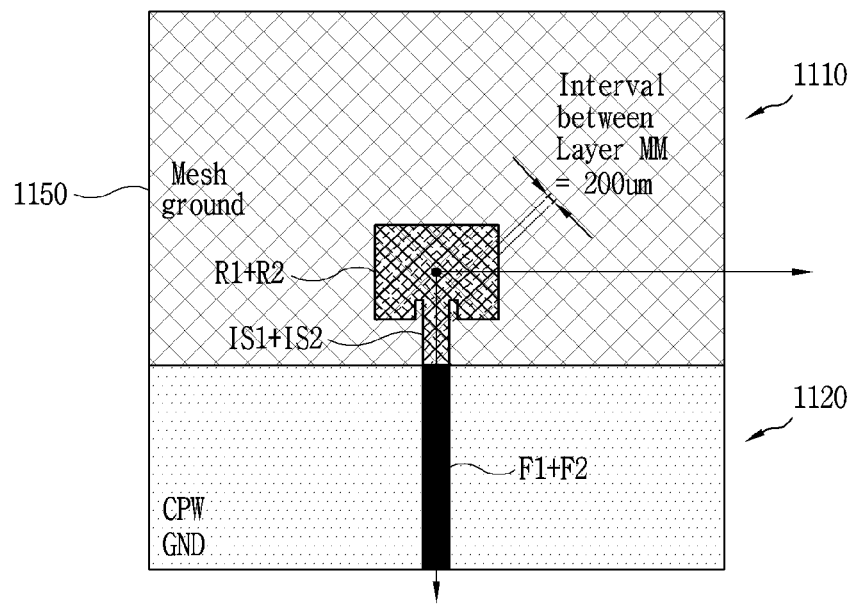

Meanwhile, FIGS. 7A and 7B show structures of substrates on which both an antenna layer and a ground layer are implemented as a metal mesh grid structure. Specifically, FIG. 7A shows structures in which a lower patch layer is aligned on top of a mesh ground layer. Also, FIG. 7B shows structures in which an upper antenna layer with an upper patch is in alignment with a lower antenna layer with a lower patch and a ground layer.

Figure 8:
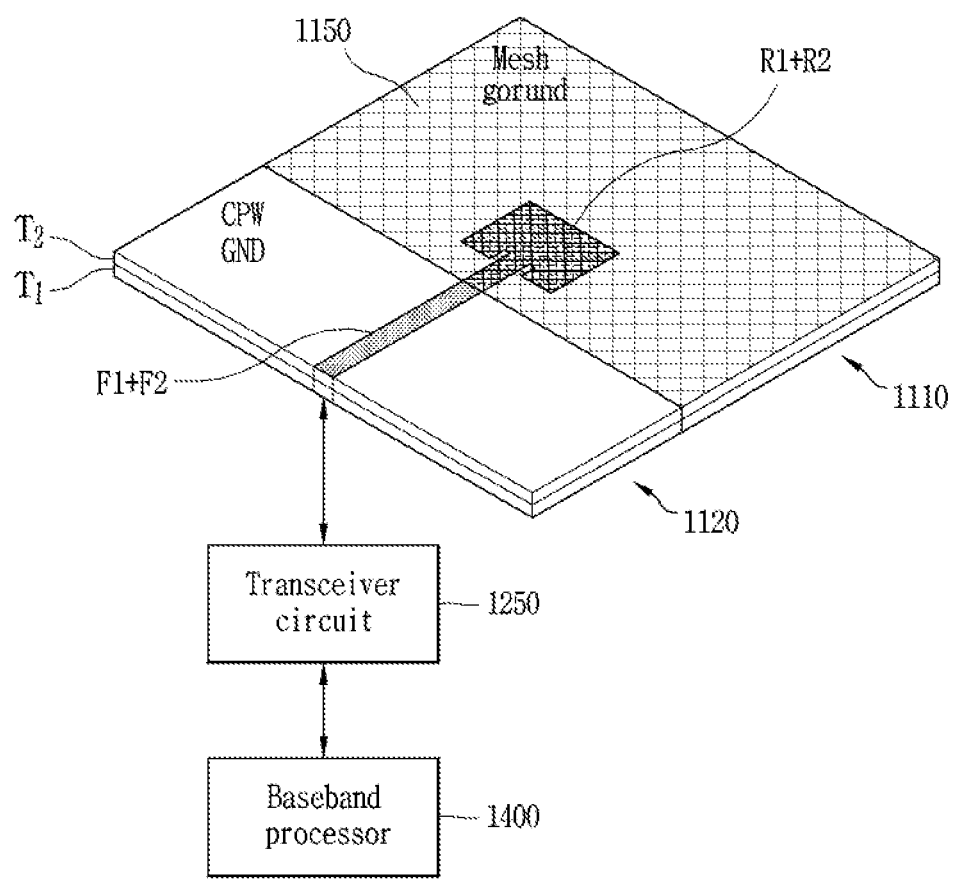
FIG. 8 shows a configuration in which a transparent antenna having a metal mesh grid structure according to an embodiment is connected to a transceiver circuit and a baseband processor.
Figure 13:
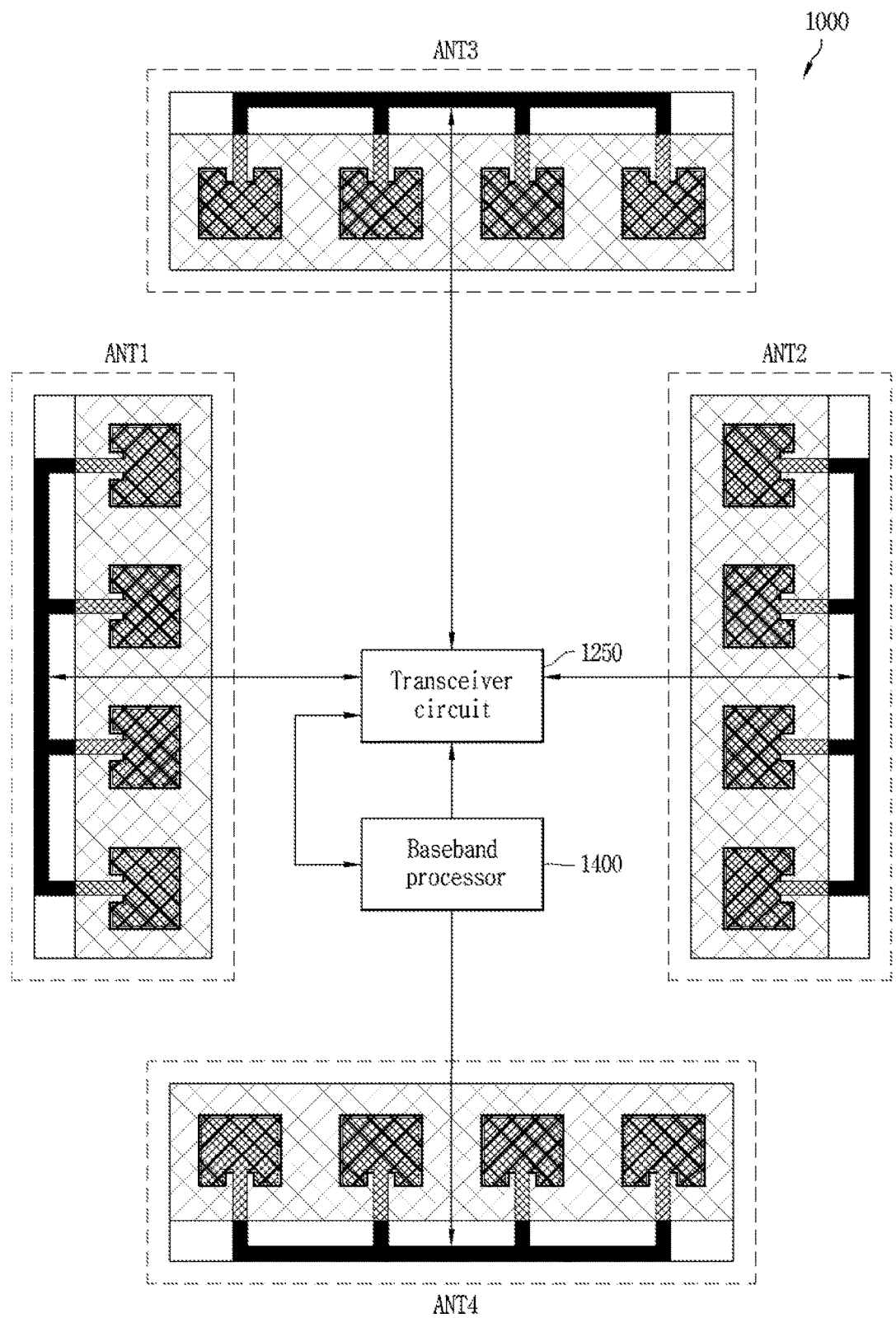
FIG. 13 shows a configuration in which, when a transparent antenna having a metal mesh grid structure includes a plurality of array antennas, the plurality of array antennas is connected to a transceiver circuit and a baseband processor.

Meanwhile, FIG. 8 shows a configuration in which a transparent antenna having a metal mesh grid structure according to an embodiment is connected to a transceiver circuit and a baseband processor. In this regard, FIG. 13 shows a configuration in which, when a transparent antenna having a metal mesh grid structure includes a plurality of array antennas, the plurality of array antennas is connected to a transceiver circuit and a baseband processor.

Hereinafter, an electronic device having a transparent antenna according to the present disclosure will be described in detail with reference to FIG. 1A to FIG. 8 and FIG. 13. Thus, the electronic device having a transparent antenna according to the present disclosure may include a transparent antenna 1110 and a transmission line 1120. In this regard, the transparent antenna 1110 may refer to a transparent antenna region comprising a patch antenna configured in a metal mesh grid structure and a substrate area where the patch antenna is disposed. Also, the transmission line 1120 may refer to a transmission line area comprising a transmission line such as a feedline for feeding power to the transparent antenna 1110 and a substrate area where the transmission line is disposed.

In an electronic device having a transparent antenna according to the present disclosure, it is necessary to use a substrate made of a transparent material because of the characteristics of the transparent antenna. In this regard, in some applications, a transparent, easily bendable substrate such as PET may be used. However, these substrates are usually made very thin, for example, to a thickness of 0.1 T to 0.5 T. Due to this, antennas designed on these substrates are hard to meet a target bandwidth BW.

In this regard, the transparency of an antenna is in a correlation with substrate thickness. For high transparency, the substrate may be made thin. In contrast, a patch antenna using a thin substrate is hard to cover a broad bandwidth (BW). Accordingly, in the present disclosure, a multi-layer mesh type antenna may be designed to have a different resonant frequency on each layer. In this case, the antenna may be disposed on each layer according to a target transparency.

Specifically, the resonant frequency and bandwidth (BW) of a multi-layer patch antenna may be adjusted by adjusting the resonant frequency of each multi-layer mesh type antenna. Also, when implementing an antenna in that frequency band, the antenna is required to be designed in such a way as to meet the required transparency and radiation gain. To this end, in the present disclosure, it is necessary to achieve an antenna transparency of 85% or higher and a target bandwidth of about 2 GHz or higher in mmWave bands. In this regard, the patch type antenna requires parameter tuning to obtain the target bandwidth without structural changes. In this regard, in a transparent antenna having a metal mesh line structure, it is not easy to make structural changes to the patch type antenna.

Moreover, in the present disclosure, the moiré effect may occur because antennas are disposed to correspond to uniform spatial frequencies. Accordingly, there is a need to design a structure for reducing the moiré effect.

In this regard, the superimposition of two or more patterns with a heterogeneous periodic shape in a space forms a larger shape than in the original spatial period. This is called moiré interference. A shape created by moiré interference is referred to as a moiré fringe.

Notably, a variety of patterns appear in LED/OLED display pixel structures, generally, in a diamond pixel structure. In this regard, the diamond pixel structure has the following advantages. A diamond PenTile basically includes a total of four subpixels including two green subpixels and one larger blue subpixel and one larger red subpixel. Here, the boundary of one pixel is ambiguous depending on the image, which may lead to higher resolution.

Moreover, the human eye sensitively responds to green and sees it better than any other color. Thus, it is possible to render subtle shades of green by arranging a large amount of tiny pixels. This produces better effects when displaying heavily wooded areas or express subtle differences in shades of green. Also, the subpixel size of blue and red to which the human eye is less sensitive may be increased for higher brightness, in order to help enhance the lifetime characteristics of blue which has poor lifetime characteristics. Therefore, higher display quality can be achieved by strategically disposing each color area.

Meanwhile, the transparent antenna 1110 according to the present disclosure may be formed of a multi-layer metal mesh grid structure on a plurality of multi-layer substrates, as shown in FIG. 5A, in order to reduce the moiré effect. Referring to FIG. 5A, the number of layers in the metal mesh grid structure may be four. Such a plurality of metal mesh lines R1 to R4 may be formed on different substrates S1 to S4, respectively. Moreover, the metal mesh lines R1 to R4 may be placed a predetermined distance apart from each other, in order to reduce the moiré effect.

In this regard, the transparent antenna 1110 composed of a plurality of metal mesh lines disposed on different layers may be embedded in a display to radiate a signal to the front surface of the display. Meanwhile, the transmission line 1120 may be configured to feed power to the transparent antenna 1110. To this end, the transmission line 1120 may be configured in the form of a CPW line, and be connected to an impedance matching part corresponding to an end of the transparent antenna 1110. Alternatively, the transmission line 1120 may be disposed on a substrate on a different layer than the transparent antenna 1110 so as to indirectly feed signals to the transparent antenna 1110.

Meanwhile, the transparent antenna 1110 may include a first radiator R1 and a second radiator R2 disposed above the first radiator R1. In this regard, the metal mesh grid structure constituting the second radiator R2 may be offset relative to the metal mesh grid structure constituting the first radiator R1, thereby reducing the moiré effect.

In this regard, the first radiator R1 may be configured as a first metal mesh grid on a first substrate. On the other hand, the second radiator R2 may be configured as a second metal mesh grid on a second substrate disposed above the first substrate. In this regard, as shown in FIG. 5B and FIG. 5C, the second metal mesh grid may be offset by a predetermined distance in one axial direction from the first metal mesh grid.

Meanwhile, the transparent antenna 1110 may further include another radiator in addition to the first radiator R1 and the second radiator R2. In this regard, the transparent antenna 1110 may include first to third radiators R1 to R3. Otherwise, the transparent antenna 1110 may include first to fourth radiators R1 to R4, as shown in FIGS. 5B and 5C. Meanwhile, the number of layers in the plurality of metal mesh grid structures is not limited to n=2, 3, and 4, but may be set to a higher value depending on the application in order to reduce the moiré effect and increase radiation.

In this regard, the third radiator R3 may be configured as a third metal mesh grid on a third substrate disposed above the second substrate. In this regard, the third metal mesh grid may be offset by a predetermined distance in one axial direction from the second metal mesh grid. In this case, the first to third metal mesh grids may be disposed in such a way that the interval length $IL_i$ between the metal mesh grids of adjacent substrate layers varies with each substrate layer.

Also, the fourth radiator R4 may be configured as a fourth metal mesh grid on a fourth substrate disposed above the third substrate. In this regard, the fourth metal mesh grid may be offset by a predetermined distance in one axial direction from the third metal mesh grid. In this case, the first to fourth metal mesh grids may be disposed in such a way that the interval length $IL_i$ between the metal mesh grids of adjacent substrate layers varies with each substrate layer.

Meanwhile, the interval length $IL_i$ between each metal mesh grid may be associated with the target transparency of the transparent antenna. In this regard, the interval length $IL_i$ between the metal mesh grids of adjacent substrate layers may be set to be greater than the minimum interval length $IL_{imin}$ between metal meshes for the target transparency of the transparent antenna. Accordingly, the minimum interval length $IL_{imin}$ between metal meshes may decrease inversely as the target transparency and the number of substrate layers increase.

For example, assuming that the width of a single mesh required to achieve a transparency of 85% is 100 um, the layers (n=1, 2) of a two-layer antenna may be set to have a metal mesh interval of 200 um. Here, the metal mesh interval corresponds to the interval between mesh(I) of FIG. 5B. Meanwhile, the layers (n=2) are disposed in such a way that the layer mesh interval between the layers (n=1) and (n=2) (interval between layer (IL) of FIG. 5B) is 100 um.

For another example, for a transparent antenna designed to have four layers, the metal mesh interval (I) of the layers (n=1, 2, 3, 4) may be set to 400 um. Meanwhile, the interval IL between layer may be set to 100 um.

Meanwhile, the interval length $IL_i$ between the metal mesh grids of adjacent substrate layers may be set to increase with increasing thickness, in consideration of the different thicknesses of the substrate layers. Referring to FIG. 5A, assuming that the plurality of substrates S1 to S4 are equal in thickness, the interval length $IL_i$ between the metal mesh grids may be set equal.

However, in a case where the thickness of the plurality of substrates S1 to S4 is increased, the interval length $IL_i$ between the metal mesh grids may increase proportionally. On the contrary, in a case where the thickness of the plurality of substrates S1 to S4 is decreased, the interval length $IL_i$ between the metal mesh grids may decrease proportionally.

For example, assuming that the width of a single mesh required to achieve a transparency of 85% is 100 um, if the number of substrate layers is n=3, the interval IL1 between the layers (n=1) and (n=2) may be set to 150 um, and the interval IL2 between the layers (n=2) and (n=3) may be set to 250 um. In this regard, the mesh intervals IL1 and IL2 may be set to 150 mm and 250 mm, respectively, in consideration of the substrate thickness. On the other hand, if the substrate thickness is decreased, the mesh intervals IL1 and IL2 may be set to 250 mm and 150 mm, respectively.

Meanwhile, when the number of substrate layers is (n=3), the first to third radiators may be first to third patch radiators, respectively, which include a plurality of metal mesh grid lines. In this regard, the first to third patch radiators may be formed as an inset structure IS1 and IS2 for impedance matching, as shown in FIGS. 7A and 7B. Particularly, the first to third patch radiators may differ in horizontal length, vertical length, inset length, and inset width so that the transparent antenna 1100 is capable of wideband operation.

Metal mesh grids implemented on a plurality of layers according to the present disclosure may be diamond or rectangular. In this regard, as shown in FIG. 5B, the first to third metal mesh grids may be configured as diamond grids. In this case, the diamond, first to third metal mesh grids may be offset by a predetermined distance along the horizontal or vertical axis of the display.

Meanwhile, if the first to third metal mesh grids are configured as diamond grids, square metal mesh lines on the outer rims of the first to third radiators may be removed, as shown in FIG. 6A and FIG. 6B. In this regard, the square metal mesh lines on the outer rims of the first to third radiators may be removed in order to reduce the moiré effect.

Moreover, as shown in FIG. 5B, the first to fourth metal mesh grids may be configured as diamond grids. In this case, the diamond, first to fourth metal mesh grids may be offset by a predetermined distance along the horizontal or vertical axis of the display.

Meanwhile, the first to fourth metal mesh grids are configured as diamond grids, square metal mesh lines on the outer rims of the first to fourth radiators may be removed. In this regard, the square metal mesh lines on the outer rims of the first to fourth radiators are removed in order to reduce the moiré effect.

On the other hand, as shown in FIG. 5C, the first to third metal mesh grids may be configured as rectangular grids. In this case, the rectangular first to third metal mesh grids may be offset by a predetermined distance along the horizontal or vertical axis of the display.

Meanwhile, when the first to third metal mesh grids are configured as rectangular grids, square metal mesh lines on the outer rims of the first to third radiators may be removed. In this regard, the square metal mesh lines on the outer rims of the first to third radiators may be removed in order to reduce the Moiré effect.

Moreover, as shown in FIG. 5C, the first to fourth metal mesh grids may be configured as rectangular grids. In this case, the rectangular first to fourth metal mesh grids may be offset by a predetermined distance along the horizontal or vertical axis of the display.

Meanwhile, when the first to fourth metal mesh grids are configured as rectangular grids, square metal mesh lines on the outer rims of the first to fourth radiators may be removed. In this regard, the square metal mesh lines on the outer rims of the first to fourth radiators may be removed in order to reduce the Moiré effect.

In relation to the transparent antenna according to the present disclosure, the ground layer also may be configured as a metal mesh grid. In this regard, referring to FIGS. 7A to 8, the transparent antenna 1110 may further include a ground layer (mesh ground) 1150 including a plurality of metal mesh grids under the first radiator R1, so as to operate as a ground for the transparent antenna 1110. In this regard, the plurality of metal mesh grids of the ground layer 1150 may be in alignment with the first metal mesh grid of the first radiator R1 so as to maintain the transparency of the transparent antenna 1100.

Meanwhile, the first radiator R1 according to the present disclosure may be connected to a first inset line IS1 for impedance matching, and the first inset line IS1 may be formed as a metal mesh line. In this regard, the transmission line 1120 may be formed as a coplanar waveguide (CPW) structure filled with metal in an un-transparent region. Meanwhile, a first feed portion F1 of the CPW structure may be disposed on the first substrate S1 and connected to the first inset line IS1 of the first radiator R1.

Also, the second radiator R2 may be connected to a second inset line IS2 for impedance matching, and the second inset line IS2 may be formed as a metal mesh line. In this regard, the transmission line 1120 may be formed as a coplanar waveguide (CPW) structure filled with metal in an un-transparent region. Meanwhile, a second feed portion F2 of the CPW structure may be disposed on the second substrate S2 and connected to the second inset line IS2 of the second radiator R2.

As described above, the transparent antenna implemented as multi-layer metal mesh lines having an offset structure according to the present disclosure has the following structural characteristics:

1) A ground portion of a patch antenna having a multi-layer antenna portion may include a mesh region for transparency and an opaque region (made of a conductor material). The mesh region and the opaque region are preferably made of a highly conductive material (e.g., Ag, Cu, etc.). A thin substrate may be laminated over the ground portion.
2) A lower antenna in the multi-layer mesh antenna portion may be designed as follows. The length and width of the lower antenna, the width of a lower feeder, and the length and width of a lower inset may be adjusted to a target center frequency. In this case, a thin substrate may be laminated over the lower antenna.
3) An upper antenna in the multi-layer mesh antenna portion may be designed as follows. The length and width of the upper antenna, the width of an upper feeder, and the length and width of an upper inset may be adjusted to the target center frequency. In this case, a mesh pattern of the upper antenna portion may be shifted by P/2 along the horizontal and vertical axes in consideration of transparency and radiation gain.

4) The ground portion, the lower antenna, and the upper antenna may be stacked in alignment. In this example, the mesh interval between the lower and upper antennas is 200 IA, thereby achieving a transparency of 85% or higher.

Meanwhile, referring to FIGS. 8 and 13, an electronic device having the transparent antenna 1000 may further include a transceiver circuit 1250 and a baseband processor 1400.

Referring to FIG. 13, the transparent antenna may include one-dimensional array antennas which are a plurality of transparent antenna elements placed a predetermined distance apart from each other. Particularly, the one-dimensional array antennas may be arranged as first to fourth array antennas ANT1 to ANT4 in different areas of the display. In this regard, the first to fourth array antennas ANT1 to ANT4 may include (4×1) array antennas. However, the array antennas are not limited to this, but may be (2×1), (6×1), or (8×1) array antennas depending on beamwidth requirements, frequency band, and so forth.

In this regard, the first to fourth array antennas ANT1 to ANT4 may be implemented as two-dimensional array antennas, that is, (M×N) array antennas, in different areas of the display. In this regard, the array antennas may be implemented as various array antennas depending on beamwidth requirements, frequency band, and so forth.

Referring to FIGS. 8 to 13, the baseband processor 1440 may perform MIMO by using two or more of the first to fourth array antennas ANT1 to ANT4.

Moreover, the electronic device having the transparent antenna according to the present disclosure may perform beamforming independently through the first to fourth array antennas ANT1 to ANT4. In this regard, the first array antenna ANT1 and the second array antenna ANT2 may be disposed on a side of the electronic device. In this case, the first array antenna ANT1 and the second array antenna ANT2 are laterally symmetrical and therefore reduce the level of mutual interference. Also, it is possible to increase the efficiency of power feeding to the first array antenna ANT1 and the second array antenna ANT2 through a CPW line implemented on a FPCB on a side of the electronic device.

Meanwhile, the third array antenna ANT3 and the fourth array antenna ANT4 may be disposed on upper and lower parts of the electronic device. In this case, the third array antenna ANT3 and the fourth array antenna ANT4 are vertically symmetrical and therefore reduce the level of mutual interference. Also, it is possible to increase the efficiency of power feeding to the third array antenna ANT3 and the fourth array antenna ANT4 through a CPW line implemented on a FPCB on a side of the electronic device.

As described above, the baseband processor 1400 may perform one-dimensional beamforming while performing MIMO by using two or more of the first to fourth array antennas ANT1 to ANT4. To this end, the baseband processor 1400 may perform one-dimensional beamforming by controlling the transceiver circuit 1250 so as to vary the phase of a signal applied to the transparent antenna elements of the two or more of the first to fourth array antennas ANT1 and ANT4.

In this regard, when MIMO is performed through the first to fourth array antennas ANT1 to ANT4, the beam direction of each of the antennas is set differently, thereby realizing spatial diversity. Specifically, beams are directed at a first angle through the first array antenna ANT1, and beams are directed at a second angle through the second array antenna ANT2.

To realize spatial diversity, the baseband processor 1400 may control such that a main beam radiated from the first array antenna ANT1 is directed at the first angle and generates a null pattern at the second angle. Also, the baseband processor 1400 may control such that a main beam radiated from the second array antenna ANT2 is directed at the second angle and generates a null pattern at the first angle.

Meanwhile, the interval length between mesh grids disposed on different substrates may be set in consideration of the maximum beamforming angle. In this regard, antenna efficiency may decrease as the directivity angle of the antenna gets farther from the boresight. Accordingly, transparency requirements may be alleviated in consideration of the maximum directivity angle of the antenna. For example, for the maximum directivity angle of the antenna set to 30 degrees, antenna efficiency may be reduced by about 50%. Accordingly, the transparency requirements may be reduced from 85% to 80%, 75%, and so forth. Therefore, the interval between metal mesh lines may be designed in such a way that the interval between metal meshes is narrowed to increase antenna efficiency.

In the foregoing, an electronic device having a transparent antenna according to the present disclosure has been described. More specifically, a plurality of array antennas in the form of a transparent antenna according to the present disclosure and an operation of a processor controlling the same have been described. Hereinafter, electrical characteristics and transparency of a transparent antenna according to the present disclosure will be described.

Figure 9A:
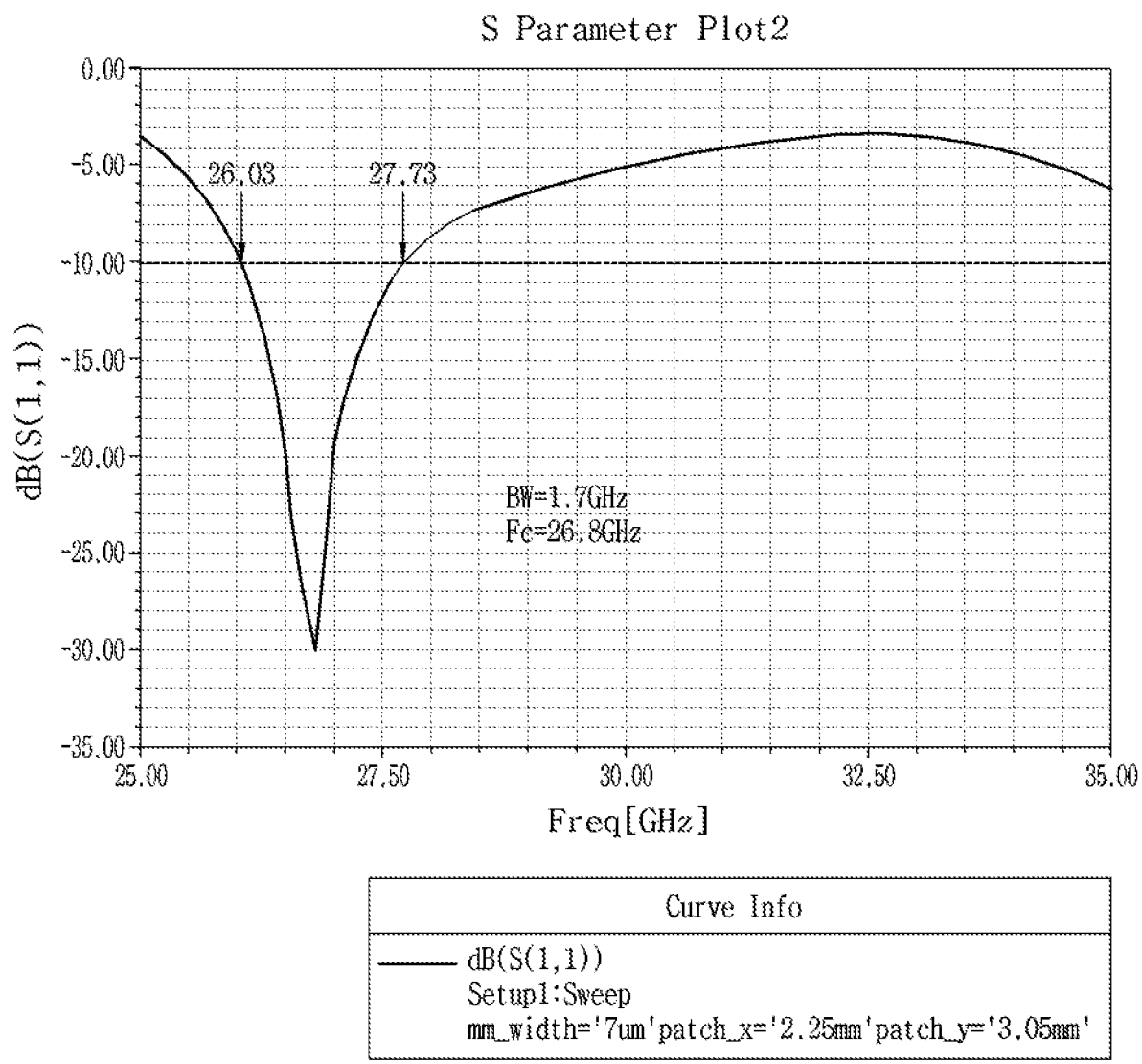
FIGS. 9A and 9B show reflection coefficients of a transparent antenna having a single-layer metal mesh grid structure in a mmWave band.
Figure 9B:
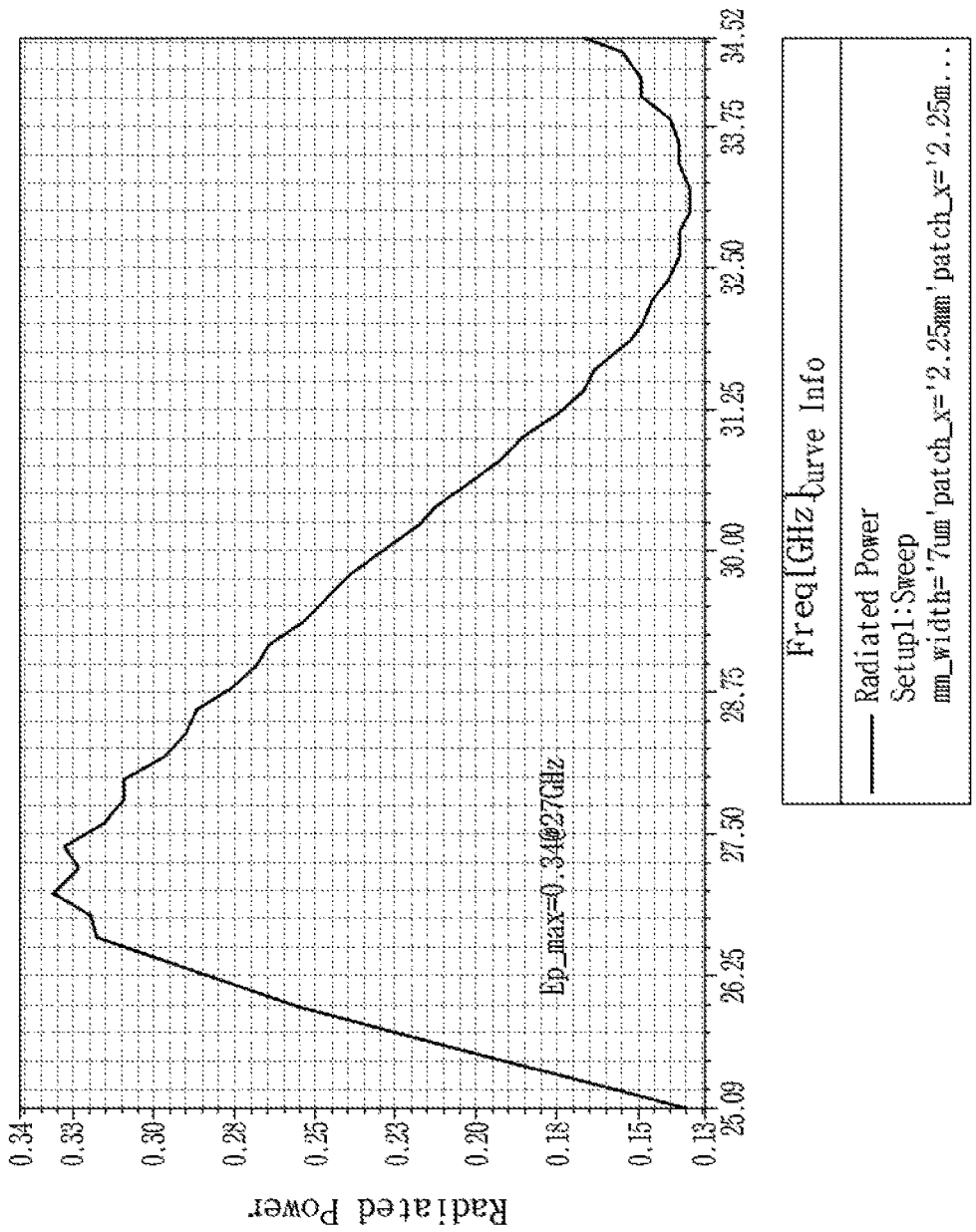
Figure 10A:
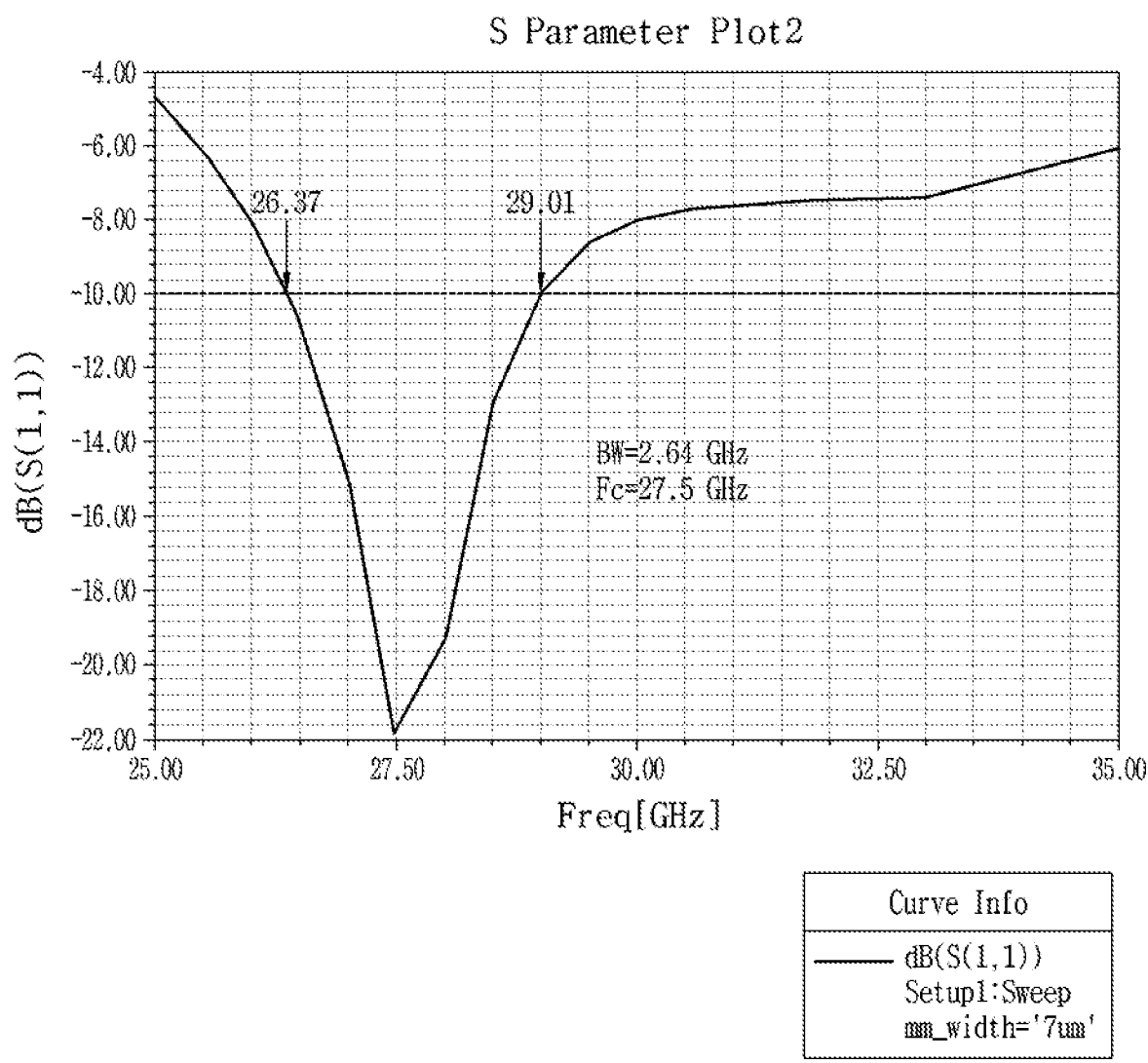
FIGS. 10A and 10B show reflection coefficients of a transparent antenna having a multi-layer metal mesh grid structure in a mmWave band.
Figure 10B:
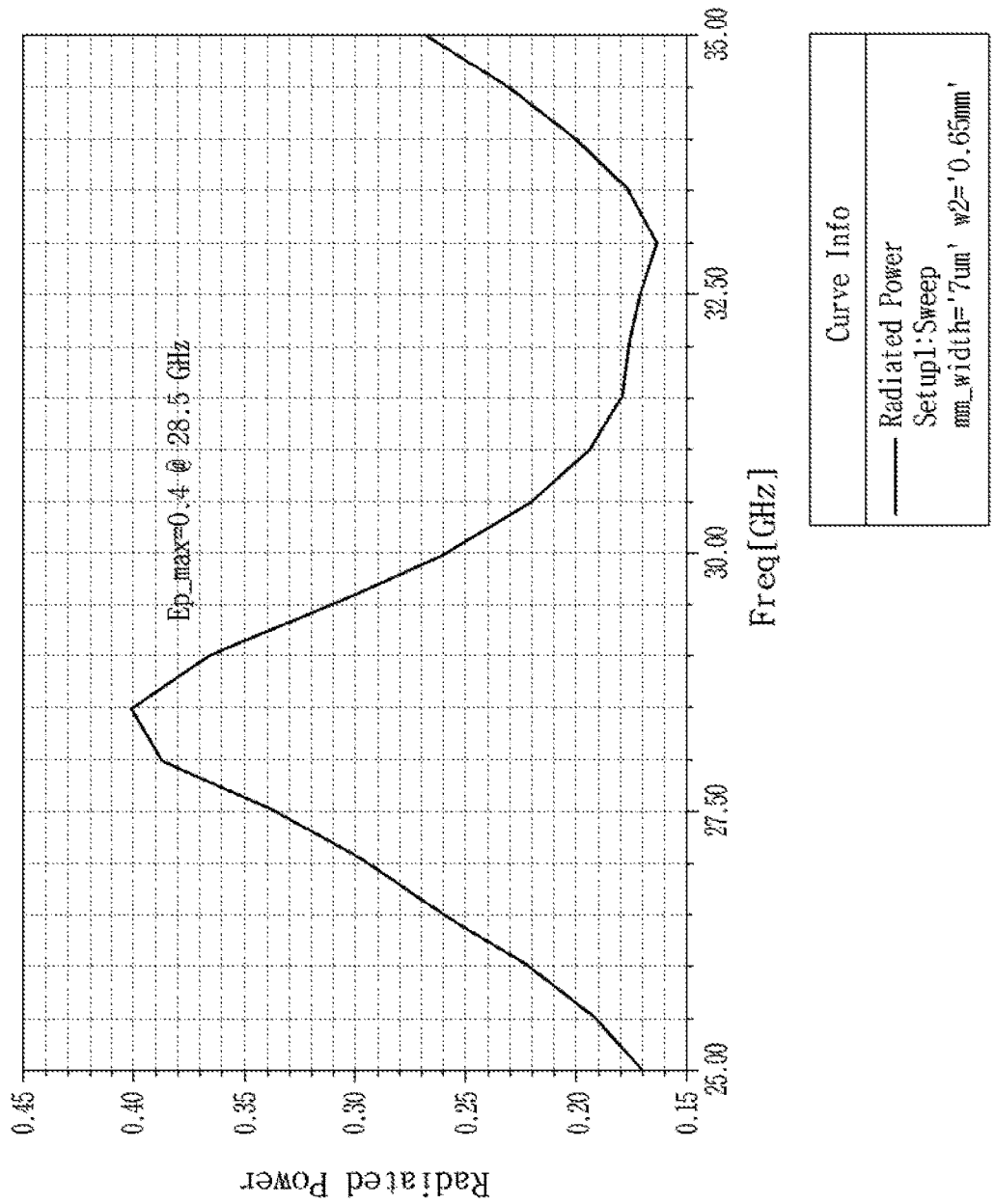

In this regard, FIGS. 9A and 9B show reflection coefficients of a transparent antenna having a single-layer metal mesh grid structure in a mmWave band. On the other hand, FIGS. 10A and 10B show reflection coefficients of a transparent antenna having a multi-layer metal mesh grid structure in a mmWave band. Here, first and second metal mesh lines are offset from each other to reduce the moiré effect.

Specifically, FIGS. 9A and 9B show characteristics of a transparent antenna having a single-layer metal mesh grid structure, when multi-layer substrate thickness is T1=T2=0.2 T. On the other hand, FIGS. 10A and 10B show characteristics of a transparent antenna having a multi-layer metal mesh grid structure, when multi-layer substrate thickness is T1=T2=0.2 T.

Referring to FIG. 9A, the transparent antenna having a single-layer metal mesh grid structure resonates at 26.8 GHz, and has a bandwidth BW of 1.7 GHz. On the other hand, referring to FIG. 10A, the transparent antenna having a multi-layer metal mesh grid structure resonates at 27.5 GHz, and has a bandwidth BW of 2.64 GHz. Accordingly, a plurality of metal mesh grid structures having an offset structure according to the present disclosure may reduce the moiré effect and provide a transparent antenna with wideband characteristics. Specifically, the bandwidth characteristics may be increased by about 63% by means of a multi-layer metal mesh grid structure (n=2) having an offset structure.

Meanwhile, referring to FIG. 9B, the efficiency of the transparent antenna having a single-layer metal mesh grid structure is about 0.34 (34%) at 27 GHz. On the other hand, referring to FIG. 10B, the efficiency of the transparent antenna having a multi-layer metal mesh grid structure is about 0.4 (40%) at 27 GHz. Accordingly, a plurality of metal mesh grid structures having an offset structure according to the present disclosure may reduce the moiré effect and provide a transparent antenna with improved antenna efficiency.

Figure 11:
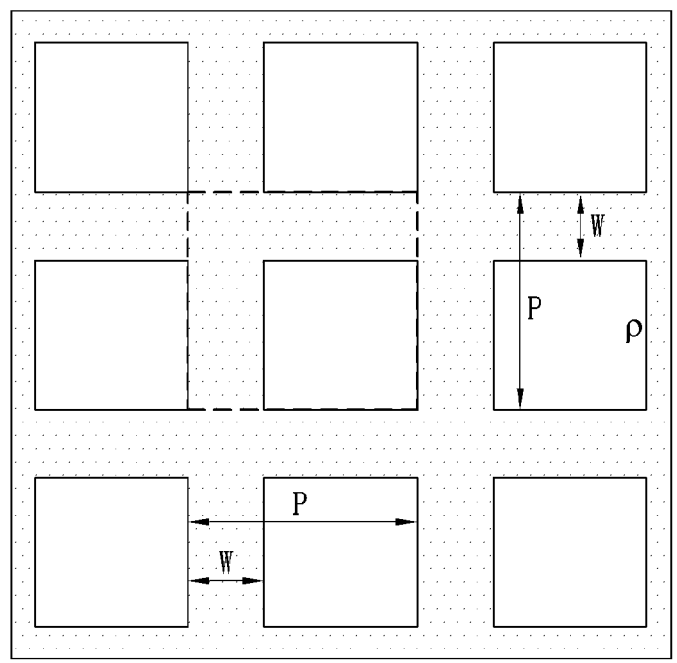
FIG. 11 shows a metal mesh grid structure according to an example.
Figure 11:
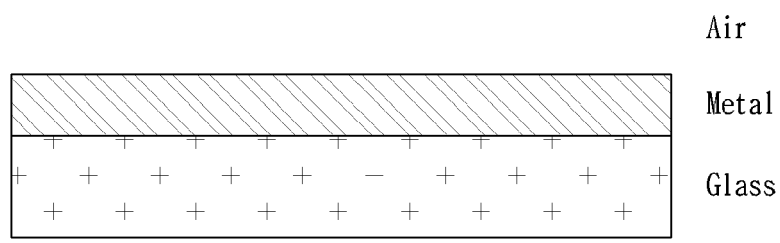

Meanwhile, a theoretical explanation regarding the transparency of a transparent antenna may be provided. In this regard, FIG. 11 shows a metal mesh grid structure according to an example. (a) of FIG. 11 shows a top view of a metal mesh grid structure, and (b) of FIG. 11 shows a side view of the metal mesh grid structure. Referring to (b) of FIG. 11, it can be assumed that a metal mesh line is disposed on a glass substrate in a single substrate structure.

Referring to FIG. 11, transparency may be determined as in Equation 1 depending on the pitch p of the metal mesh grid structure, the width W of the metal mesh line, and the visible ratio on pitch (t).

$$T_{total} = T_{grid} * T_{glass} = \left(1 - \frac{W}{p}\right)^2 * \left(1 - \left(\frac{n_{glass} - n_{air}}{n_{glass} + n_{air}}\right)^2\right)^2 \quad \text{[Equation 1]}$$

Accordingly, as the pitch p of the metal mesh grid structure increases or the width W of the metal mesh line decreases, the overall transparency T increases. However, the increase in the pitch p of the metal mesh grid structure and the decrease in the width W of the metal mesh line may reduce the ratio of metal area in the entire area. Thus, antenna radiation efficiency may be reduced due to the increase in the overall transparency T of the transparent antenna. Therefore, the present disclosure proposes a metal mesh grid structure disposed on a plurality of layers having an offset structure, which is capable of keeping transparency T at a certain level, reducing the moiré effect, and optimizing antenna radiation efficiency.

Figure 12A:
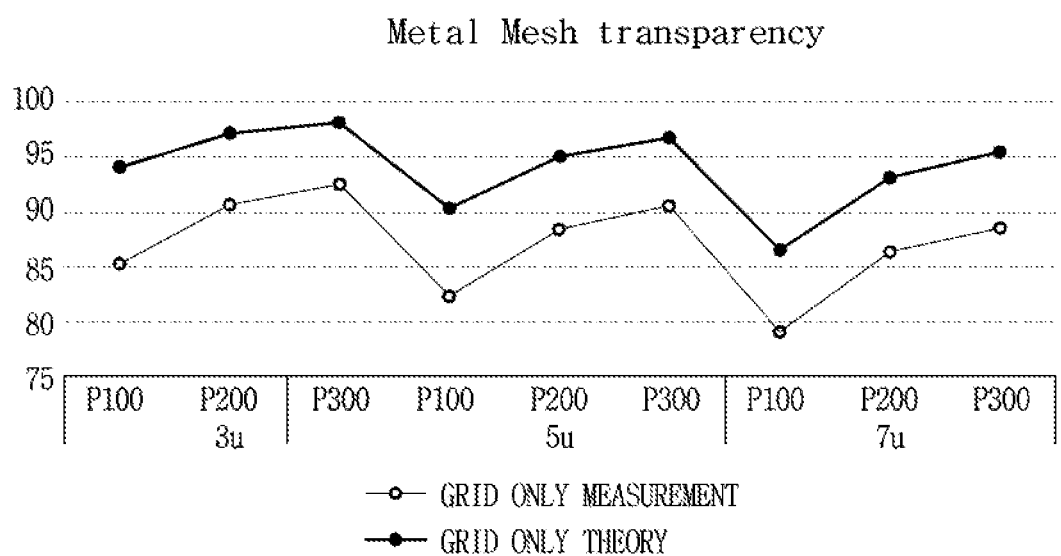
FIGS. 12A to 12C show comparisons of theoretical values and actual measured values of transparency according to various examples.
Figure 12B:
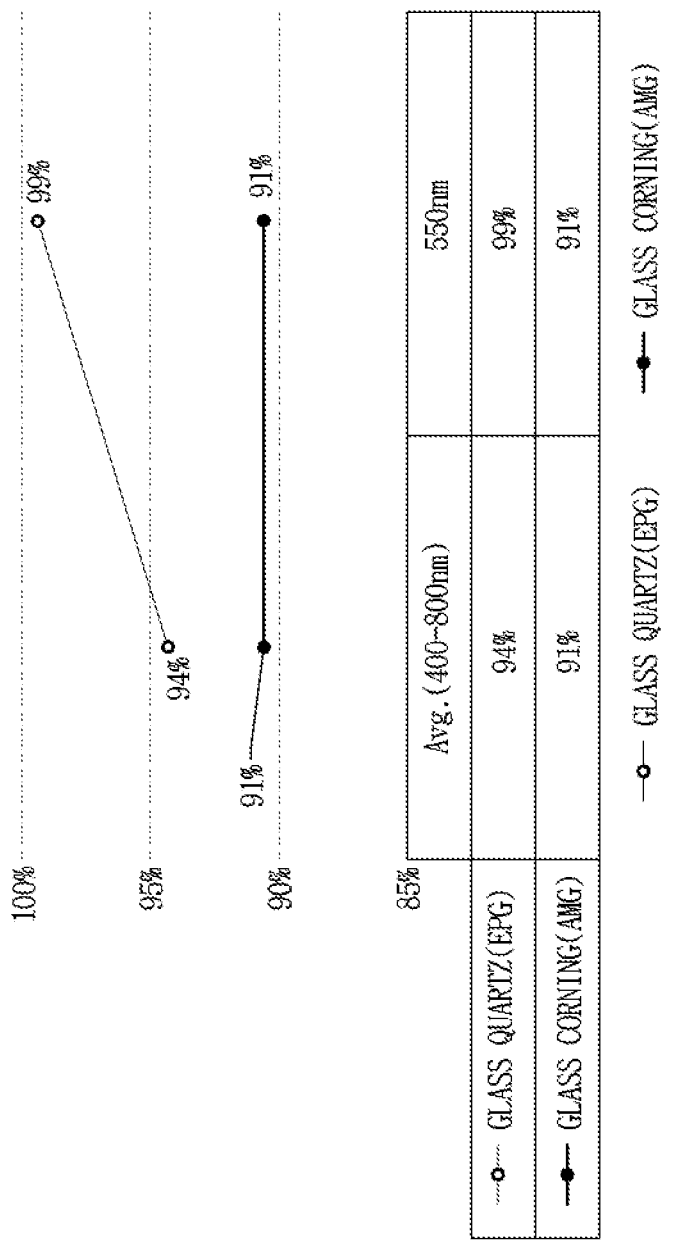
Figure 12C:
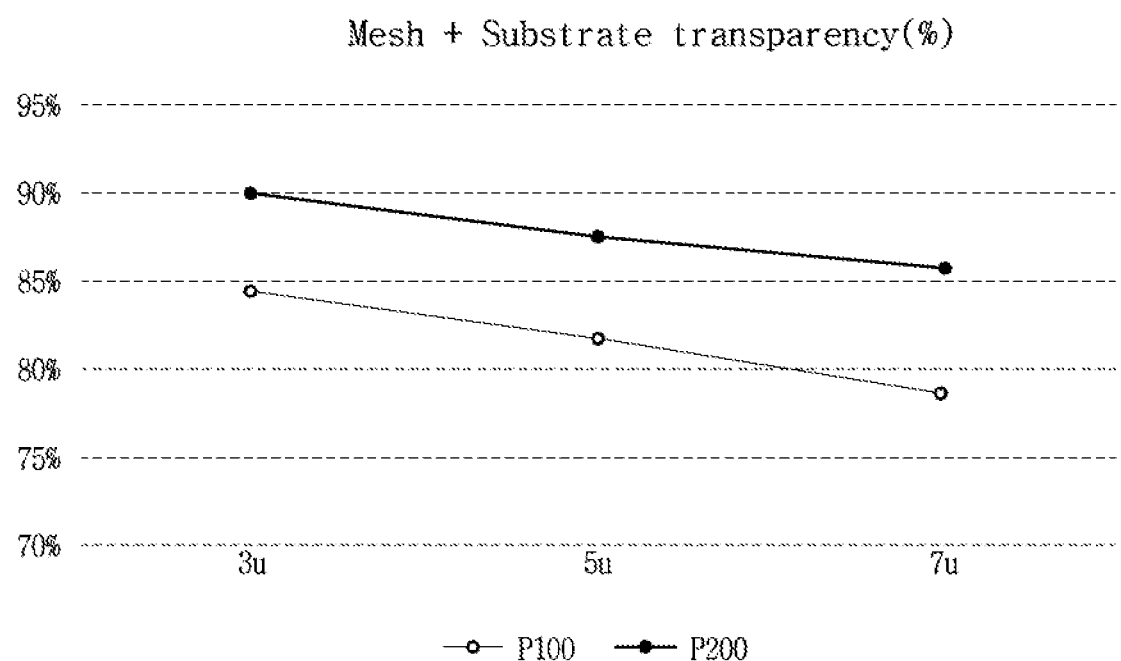

In this regard, FIGS. 12A to 12C show comparisons of theoretical values and actual measured values of transparency according to various examples. Referring to FIG. 12A, a transparency comparison between metal mesh lines with linewidths of 3 um, 5 um, and 7 um was made. Here, P100, P200, and P300 represent metal mesh structures whose pitch P is 100 um, 200 um, and 300 um, respectively. Thus, in the present disclosure, for the first to fourth metal mesh grids of the first to fourth radiators S1 to S4, the offset between the metal mesh grids of adjacent layers may be set to 100 um to 300 um. Accordingly, metal mesh lines having an offset structure on a multi-layer substrate according to the present disclosure may improve antenna characteristics while maintaining transparency.

Meanwhile, FIG. 12B shows measured values of glass transparency according to an example. Referring to FIG. 12B, when the interval length between metal mesh lines made of a quartz material was 400 to 800 um, the average transparency was about 94%. On the other hand, when the interval length between metal mesh lines made of a corning material was 400 to 800 um, the average transparency was about 91%.

Meanwhile, FIG. 12C shows the transparency of metal mesh lines and a substrate where the metal mesh lines are disposed. Referring to FIG. 12C, a metal mesh line with a linewidth of 3 um and a pitch of 100 um exhibited a transparency of about 85%. On the other hand, a metal mesh line with a line width of 7 um and a pitch of 100 um exhibited a transparency of about 80%.

Accordingly, in a case where the linewidth of the metal mesh line is maintained at 7 um, the transparency of about 85% may be maintained by increasing the pitch to about 200 um.

Such a multi-layer metal mesh structure having an offset structure according to the present disclosure which aims to maintain a specific degree of transparency may be designed as follows:

1) Meshes may be formed on a ground portion of a transparent antenna by using a highly conductive material.
2) After stacking thin substrates, antennas in a multi-layer antenna are designed. In this case, antenna parameters (i.e., the horizontal and vertical lengths of each antenna, the width of a feeder, and the horizontal and vertical lengths of an inset) may be adjusted to a target resonant frequency, in consideration of all of the thin substrates S0 to Sn.
3) The process of 2) is done all the way up to an upper antenna disposed on the uppermost layer of every thin substrate. In this instance, an offset arrangement of mesh lines between each layer is configured in consideration of a target transparency.

Meanwhile, a transparent antenna including metal mesh lines having an offset structure and array antennas using the same according to the present disclosure, which have been described with reference to FIGS. 1 to 13, may be controlled by the baseband processor 1400. In this regard, the baseband processor 1400 is connected to the transceiver circuit 1250, and is configured to control the transceiver circuit 1250 to perform beamforming and MIMO through a plurality of array antennas ANT1 to ANT4 disposed at different positions on the electronic device.

In this regard, the baseband processor 1400 may perform beamforming in different directions so that signals are radiated in different directions through the first array antenna ANT1 and second array antenna ANT2 among the plurality of array antennas.

In this regard, the different directions may correspond to a dielectric region formed on a left side of the electronic device and a dielectric region formed on a right side thereof. Thus, the first and second array antennas according to the present disclosure may be simultaneously used to radiate different signals in different directions through different dielectric regions. Accordingly, the baseband processor 1400 may use the first and second array antennas simultaneously to radiate different signals in different directions through different dielectric regions, thereby improving the isolation between a plurality of MIMO streams.

Moreover, the baseband processor 1400 may perform beamforming in different directions so that signals are radiated in different directions through the third array antenna ANT3 and second array antenna ANT4 among the plurality of array antennas.

In this regard, the different directions may correspond to a dielectric region formed on an upper part of the electronic device and a dielectric region formed on a lower part thereof. Thus, the third and fourth array antennas according to the present disclosure may be simultaneously used to radiate different signals in different directions through different dielectric regions. Accordingly, the baseband processor 1400 may use the third and fourth array antennas simultaneously to radiate different signals in different directions through different dielectric regions, thereby improving the isolation between a plurality of MIMO streams.

In the foregoing, a transparent antenna including metal mesh lines having an offset structure, array antennas using the same, and an electronic device having the same have been described. In this regard, technical effects of the electronic device having a transparent antenna including metal mesh lines having an offset structure will be described below.

According to the present disclosure, it is possible to a moiré phenomenon by means of metal mesh lines having an offset structure.

Furthermore, according to the present disclosure, it is possible to reduce a moiré phenomenon by means of metal mesh lines having an offset structure and at the same time improve antenna characteristics.

Furthermore, according to the present disclosure, it is possible to reduce a moiré phenomenon by means of metal mesh lines having an offset structure and at the same time enhance broadband characteristics and antenna efficiency.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

In relation to the aforementioned present disclosure, design and operations of a plurality of antennas of an antenna system mounted in a vehicle and a configuration performing the control of those antennas can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. An electronic device having an antenna comprising:
a transparent antenna embedded in a display to radiate a radio signal to a front surface of the display; and
a transmission line for feeding power to the transparent antenna,
wherein the transparent antenna comprises:
a first radiator configured as a first metal mesh grid on a first substrate;
a second radiator configured as a second metal mesh grid on a second substrate disposed above the first substrate;
a first feed portion disposed on the first substrate and configured to be connected to the first metal mesh grid of the first radiator and apply a signal to the first radiator; and
a second feed portion disposed on the second substrate and configured to be connected to second metal mesh grid of the second radiator and apply a signal to the second radiator,
wherein the second metal mesh grid is offset in one axial direction from the first metal mesh grid, and
wherein the first radiator formed as the first metal mesh grid and the second radiator formed as the second metal mesh grid to be offset relative to the first metal mesh grid is configured to radiate the radio signal to the front surface of the display.

2. The electronic device of claim 1, further comprising a third radiator configured as a third metal mesh grid on a third substrate disposed above the second substrate,
wherein the third metal mesh grid is offset by a predetermined distance in the one axial direction from the second metal mesh grid, and the first to third metal mesh grids are disposed in such a way that the interval length IL, between the metal mesh grids of adjacent substrates varies with each substrate.

3. The electronic device of claim 2, further comprising a fourth radiator configured as a fourth metal mesh grid on a fourth substrate disposed above the third substrate,
wherein the fourth metal mesh grid is offset by a predetermined distance in the one axial direction from the third metal mesh grid, and the first to fourth metal mesh grids are disposed in such a way that the interval length IL, between the metal mesh grids of adjacent substrate layers varies with each substrate layer.

4. The electronic device of claim 2, wherein the interval length IL, between the metal mesh grids of adjacent substrate layers is set to be greater than the minimum interval length $ILi_{min}$ between metal meshes for a target transparency of the transparent antenna, and the minimum interval length $ILi_{min}$ between metal meshes decreases inversely as the target transparency and the number of substrate layers increase.

5. The electronic device of claim 2, wherein the interval length IL, between the metal mesh grids of adjacent substrate layers is set to increase with increasing thickness, in consideration of different thicknesses of the substrate layers.

6. The electronic device of claim 2, wherein the first to third radiators are first to third patch radiators, respectively, which include a plurality of metal mesh grid lines, and
wherein the first to third patch radiators are formed as an inset structure for impedance matching, and the first to third patch radiators differ in horizontal length, vertical length, inset length, and inset width so that the transparent antenna is capable of wideband operation.

7. The electronic device of claim 2, wherein the first to third metal mesh grids are configured as diamond grids, and
wherein the diamond first to third metal mesh grids are offset by a predetermined distance along the horizontal or vertical axis of the display.

8. The electronic device of claim 1, wherein the first and second metal mesh grids are configured as diamond grids formed in an oblique direction of a specific angle, and square metal mesh lines on the outer rims of the first and second radiators are removed in order to reduce the Moiré effect.

9. The electronic device of claim 1, wherein the transparent antenna further includes a ground layer including a plurality of metal mesh grids under the first radiator, so as to operate as a ground for the transparent antenna, and
wherein the plurality of metal mesh grids of the ground layer is in alignment with the first metal mesh grid of the first radiator so as to maintain the transparency of the transparent antenna.

10. The electronic device of claim 1, wherein the first radiator is connected to a first inset line for impedance matching, and the first inset line is formed as a metal mesh line, and
wherein the transmission line is formed as a coplanar waveguide (CPW) structure filled with metal in an un-transparent region, and the first feed portion of the CPW structure is disposed on the first substrate and connected to the first inset line of the first radiator.

11. The electronic device of claim 10, wherein the second radiator is connected to a second inset line for impedance matching, and the second inset line is formed as a metal mesh line, and
wherein the second feed portion of the CPW structure is disposed on the second substrate and connected to the second inset line of the second radiator.

12. The electronic device of claim 3, wherein, for the first to fourth metal mesh grids of the first to fourth radiators, the offset between the metal mesh grids of adjacent layers is set to 100 um to 300 um.

13. The electronic device of claim 1, further comprising:
a transceiver circuit connected to the transmission line so as to apply a signal to the respective radiators of the transparent antenna; and
a baseband processor connected to the transceiver circuit and configured to control the transceiver circuit.

14. The electronic device of claim 13, wherein the transparent antenna includes one-dimensional array antennas which are a plurality of transparent antenna elements placed a predetermined distance apart from each other, and the one-dimensional array antennas are arranged as first to fourth array antennas in different areas of the display, and
wherein the baseband processor performs MIMO by using two or more of the first to fourth array antennas.

15. The electronic device of claim 13, wherein the transparent antenna includes one-dimensional array antennas which are a plurality of transparent antenna elements placed a predetermined distance apart from each other, and the one-dimensional array antennas are arranged as first to fourth array antennas in different areas of the display, and
wherein the baseband processor performs MIMO by using two or more of the first to fourth array antennas and also performs one-dimensional beamforming by controlling the transceiver circuit so as to vary the phase of a signal applied to the transparent antenna elements of the two or more array antennas.

* * * * *